United States Patent
Iida et al.

(10) Patent No.: US 8,190,822 B2
(45) Date of Patent: May 29, 2012

(54) STORAGE CONTROL UNIT AND DATA MANAGEMENT METHOD

(75) Inventors: Junichi Iida, Odawara (JP); Xiaoming Jiang, Odawara (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 12/959,775

(22) Filed: Dec. 3, 2010

(65) Prior Publication Data

US 2011/0078379 A1    Mar. 31, 2011

Related U.S. Application Data

(63) Continuation of application No. 11/968,247, filed on Jan. 2, 2008, now Pat. No. 7,870,338.

(30) Foreign Application Priority Data

Feb. 7, 2007   (JP) ................................. 2007-027620

(51) Int. Cl.
    *G06F 12/16*   (2006.01)
(52) U.S. Cl. .................. 711/118; 711/126; 711/162
(58) Field of Classification Search .................. None
    See application file for complete search history.

(56) References Cited

U.S. PATENT DOCUMENTS

| | | | |
|---|---|---|---|
| 6,317,843 B1 | 11/2001 | Minamimoto et al. | |
| 7,124,244 B2 | 10/2006 | Shimada | |
| 7,133,282 B2 | 11/2006 | Sone | |
| 7,280,354 B2 | 10/2007 | Sone | |
| 7,529,885 B2 | 5/2009 | Kimura et al. | |
| 2001/0056543 A1 | 12/2001 | Isomura | |
| 2004/0117441 A1* | 6/2004 | Liu et al. ........................ | 709/203 |
| 2005/0081048 A1 | 4/2005 | Komaria et al. | |
| 2005/0240830 A1 | 10/2005 | Kubo et al. | |
| 2006/0015683 A1* | 1/2006 | Ashmore et al. .............. | 711/113 |
| 2006/0072369 A1* | 4/2006 | Madter et al. .................. | 365/232 |
| 2006/0106990 A1* | 5/2006 | Benhase et al. ............... | 711/135 |
| 2006/0212644 A1 | 9/2006 | Acton et al. | |
| 2008/0104308 A1* | 5/2008 | Mo et al. ........................ | 711/103 |

FOREIGN PATENT DOCUMENTS

| | | |
|---|---|---|
| EP | 1650646 | 4/2006 |
| EP | 1705574 | 6/2006 |
| JP | 6309234 | 11/1994 |
| JP | 11175406 | 7/1999 |
| JP | 2000207137 | 7/2000 |
| JP | 2004-021811 | 1/2004 |
| JP | 2004287476 | 10/2004 |
| JP | 2005044010 | 2/2005 |
| JP | 2005332471 | 12/2005 |
| JP | 2006313407 | 11/2006 |

* cited by examiner

*Primary Examiner* — Than Nguyen
(74) *Attorney, Agent, or Firm* — Brundidge & Stanger, P.C.

(57) ABSTRACT

An I/O processor determines whether or not the amount of dirty data on a cache memory exceeds a threshold value and, if the determination is that this threshold value has been exceeded, writes a portion of the dirty data of the cache memory to a storage device. If a power source monitoring and control unit detects a voltage abnormality of the supplied power, the power monitoring and control unit maintains supply of power using power from a battery, so that a processor receives supply of power from the battery and saves the dirty data stored on the cache memory to a non-volatile memory.

18 Claims, 15 Drawing Sheets

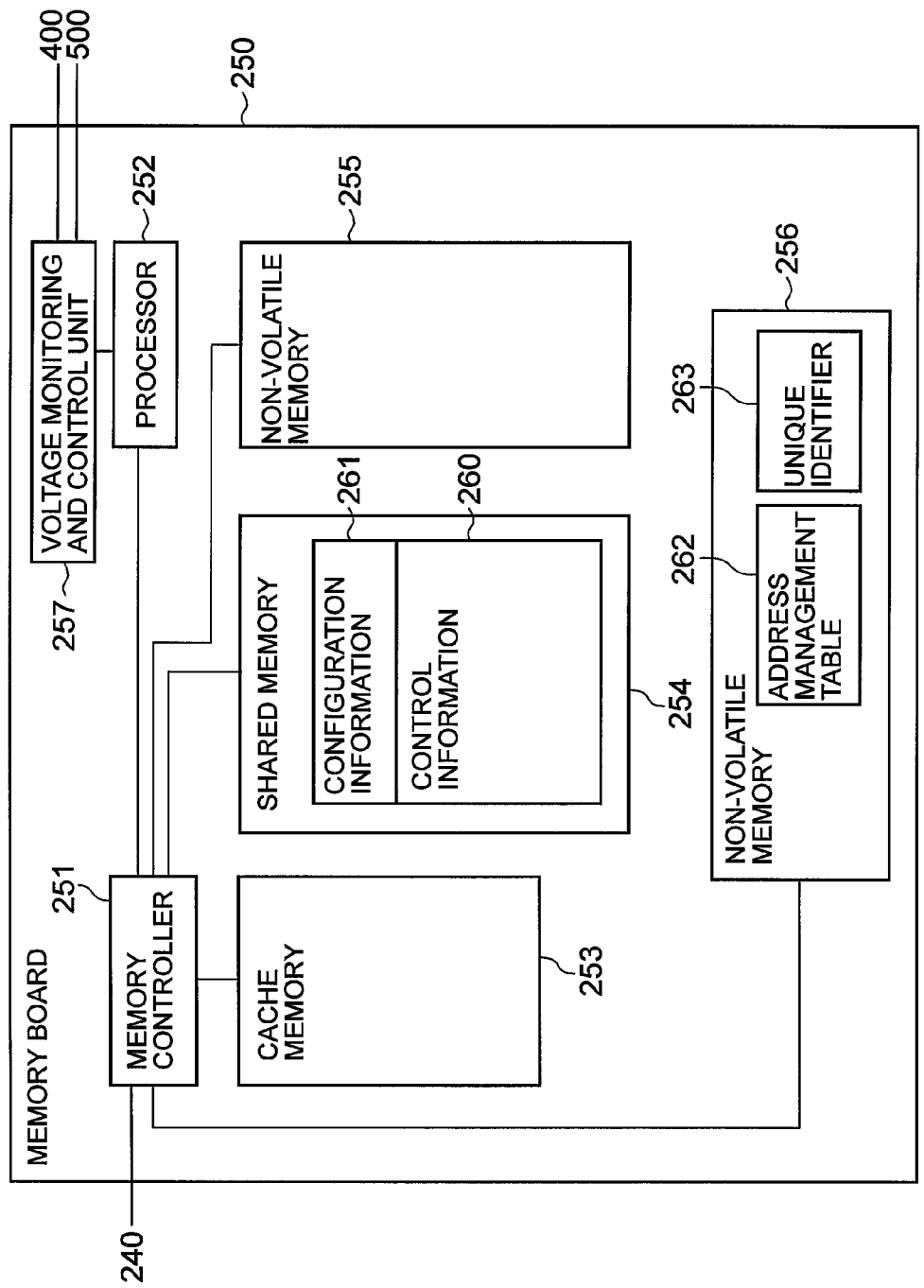

FIGURE 3A

CONTROL INFORMATION 260

| LOGICAL ADDRESS (2601) | CACHE ADDRESS (2602) | STAGING BIT (2603) | DIRTY BIT (2604) |
|---|---|---|---|
| LOGICAL ADDRESS la1 | CACHE ADDRESS ca1 | STAGING BIT sb1 | DIRTY BIT db1 |
| LOGICAL ADDRESS la2 | CACHE ADDRESS ca2 | STAGING BIT sb2 | DIRTY BIT db2 |
| ... | ... | ... | ... |
| LOGICAL ADDRESS laXX | CACHE ADDRESS caXX | STAGING BIT sbXX | DIRTY BIT dbXX |

FIGURE 3B

CONFIGURATION INFORMATION 261

| LOGICAL ADDRESS (2611) | PHYSICAL ADDRESS (2612) |
|---|---|
| LOGICAL ADDRESS la1 | PHYSICAL ADDRESS pa1 |
| LOGICAL ADDRESS la2 | PHYSICAL ADDRESS pa2 |
| ... | ... |
| LOGICAL ADDRESS laXX | PHYSICAL ADDRESS paXX |

FIGURE 4A  ADDRESS MANAGEMENT TABLE (CONTROL INFORMATION) 262A

| | 2622 | 2623 |
|---|---|---|
| 2621 | SHARED MEMORY ADDRESS (CONTROL INFORMATION) | DATA LENGTH |
| NON-VOLATILE MEMORY ADDRESS | SHARED MEMORY ADDRESS (CONTROL INFORMATION) sac1 | DATA LENGTH dl1 |
| NON-VOLATILE MEMORY ADDRESS na1 | SHARED MEMORY ADDRESS (CONTROL INFORMATION) sac2 | DATA LENGTH dl2 |
| NON-VOLATILE MEMORY ADDRESS na2 | SHARED MEMORY ADDRESS (CONTROL INFORMATION) sacXX | DATA LENGTH dlXX |
| NON-VOLATILE MEMORY ADDRESS naXX | | |

FIGURE 4B  ADDRESS MANAGEMENT TABLE (CONTROL INFORMATION) 262B

| | 2625 | 2626 |
|---|---|---|
| 2624 | SHARED MEMORY ADDRESS (CONFIGURATION INFORMATION) | DATA LENGTH |
| NON-VOLATILE MEMORY ADDRESS | SHARED MEMORY ADDRESS (CONFIGURATION INFORMATION) sas1 | DATA LENGTH dl11 |
| NON-VOLATILE MEMORY ADDRESS na11 | SHARED MEMORY ADDRESS (CONFIGURATION INFORMATION) sas2 | DATA LENGTH dl12 |
| NON-VOLATILE MEMORY ADDRESS na12 | SHARED MEMORY ADDRESS (CONFIGURATION INFORMATION) sasYY | DATA LENGTH dlYY |
| NON-VOLATILE MEMORY ADDRESS naYY | | |

FIGURE 4C  ADDRESS MANAGEMENT TABLE (CACHE DATA) 262C

| | 2628 | 2629 |
|---|---|---|
| 2627 | CACHE MEMORY ADDRESS | DATA LENGTH |
| NON-VOLATILE MEMORY ADDRESS | CACHE MEMORY ADDRESS caa1 | DATA LENGTH dl21 |
| NON-VOLATILE MEMORY ADDRESS na21 | CACHE MEMORY ADDRESS caa2 | DATA LENGTH dl22 |
| NON-VOLATILE MEMORY ADDRESS na22 | CACHE MEMORY ADDRESS caaZZ | DATA LENGTH dlZZ |
| NON-VOLATILE MEMORY ADDRESS naZZ | | |

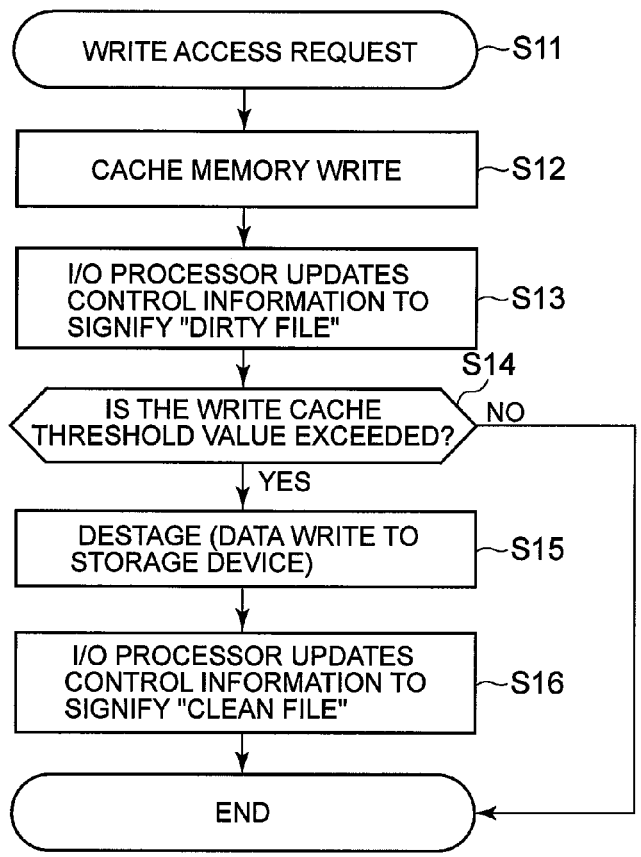
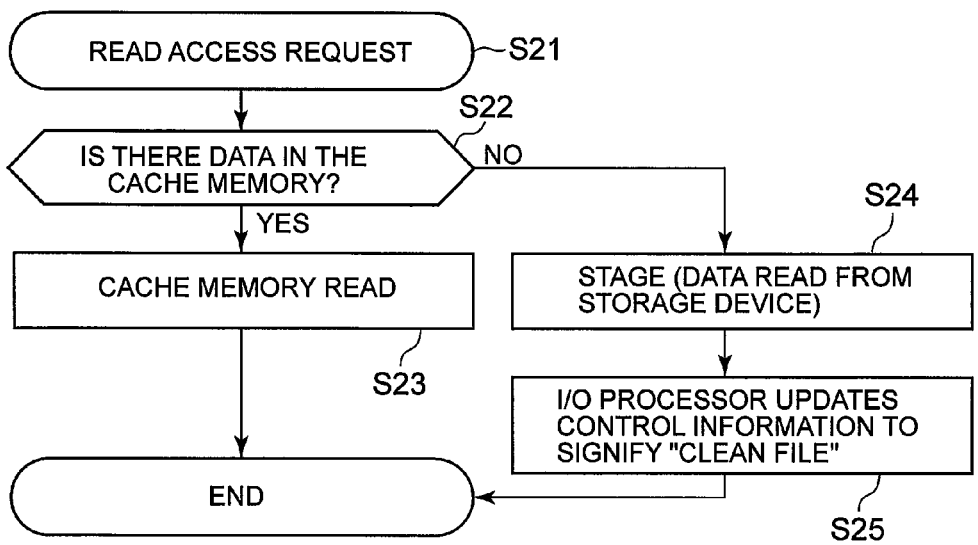

STORAGE CONTROL UNIT AND DATA MANAGEMENT METHOD

CROSS-REFERENCE TO PRIOR APPLICATION

This application relates to and claims the benefit of priority from Japanese Patent Application No. 2007-27620, filed on Feb. 7, 2007, and is a continuation application of U.S. application Ser. No. 11/968,247, filed on Jan. 2, 2008 now U.S. Pat. No. 7,870,338, the entire disclosures of which are incorporated herein by reference.

BACKGROUND OF THE INVENTION

A storage control unit may have for example a plurality of storage devices such as hard disk drives connected with it. On receiving a write command from a host computer, the storage control unit writes data to at least one storage device of the plurality of storage devices, and, on receiving a read command from the host computer, reads data from at least one storage device of the plurality of storage devices and transmits this data to the host computer.

Such a storage control unit comprises a cache memory for temporarily storing the data that is written to the storage devices in response to a write command or for temporarily storing the data that is read from the storage devices in response to a read command.

As this cache memory, typically volatile memory wherein data can be stored during power is supplied thereto is employed.

In a storage control unit comprising volatile memory as the cache memory if the supply of power to the cache memory ceases due for example to a fault of the external power supply, the data stored in the cache memory is lost.

Accordingly, in order to cope with for example such faults of the external power source, the storage control unit is provided with a battery capable of supplying power, so that, if a fault of the external power source occurs, the data stored in the cache memory can be maintained by supplying power to the cache memory from the battery.

However, since supply of power to the cache memory must be maintained until the fault is cleared, the capacity of the battery must be comparatively large. This leads to the problem that the cost of manufacturing the storage control unit is increased.

In this connection, a technique has been disclosed of preserving data even without using a battery to maintain supply of power of the cache memory until the fault is cleared, by saving the data of the cache memory to non-volatile memory (see for example Laid-open Japanese Patent Application No. 2004-21811).

If for example it is assumed that the data stored in the cache memory is saved in non-volatile memory, if all of the data of the cache memory is to be appropriately saved, it is necessary to provide non-volatile memory having a capacity equivalent to the capacity of the cache memory. This increases the manufacturing cost of the storage control unit.

On the other hand, if, in order to keep down the cost of manufacture, it is arranged to save the data by providing non-volatile memory of smaller capacity than the cache memory, the data of the cache memory cannot be adequately saved to the non-volatile memory, so there is the risk of producing a situation in which necessary data is lost.

SUMMARY OF THE INVENTION

The present invention was made in view of the above problems, its object being to provide a technique whereby the data stored in cache memory can be adequately saved, while keeping the capacity of the non-volatile memory low.

In order to solve the above problem, in a storage control unit according to an aspect of the present invention, it is noted that the data stored in the cache memory includes data (clean data) that has been reflected to the storage unit and data (dirty data) that has not been reflected to the storage unit. Specifically, in a storage control unit according to an aspect of the present invention, a determination as to whether or not to store dirty data in the storage unit is made in accordance with the amount of dirty data stored in the cache memory, and the dirty data of the cache memory is saved to non-volatile memory in the event of voltage abnormality.

Specifically, a storage control unit according to an aspect of the present invention consists in a storage control unit that, on receipt of a write access request from an external device, performs control of writing to a storage unit of data that is the subject of the write access request comprising: a power supply unit that performs supply of power from a power source; a battery that stores power so that power can be supplied; a cache memory constituted by volatile memory capable of storing data when supplied with power; a non-volatile memory capable of continuing to store data even without power supplied thereto; a request reception unit that receives the write access request when supplied with the power; a first data storage unit that stores data that is the subject of the write access request in the cache memory as cache data; a determination unit that determines whether or not the amount of dirty data, of the cache data in the cache memory, that has not been reflected to the storage unit exceeds a prescribed threshold value; a second data storage unit that, if the determination is that the threshold value has been exceeded, stores at least some of the dirty data of the cache memory in the storage unit; a power source monitoring unit that detects a voltage abnormality of the power that is supplied from the power supply unit; a save storage unit that saves in the non-volatile memory the dirty data stored in the cache memory on receipt of supply of the power from the battery, if the voltage abnormality is detected by the power source monitoring unit; and a power source supply control unit that maintains supply of power to the cache memory and the save storage unit using the power from the battery if the voltage abnormality is detected by the power source monitoring unit.

BRIEF DESCRIPTION OF THE DRAWINGS

FIG. 2 is a structure diagram of a memory board according to the first embodiment of the present invention;

FIG. 3A is a diagram showing an example of control information according to the first embodiment of the present invention;

FIG. 3B is a diagram showing an example of configuration information according to the first embodiment of the present invention;

FIG. 4A is a diagram showing an example of an address management table in respect of control information according to the first embodiment of the present invention;

FIG. 4B is a diagram showing an example of an address management table in respect of configuration information according to the first embodiment of the present invention;

FIG. 4C is a diagram showing an example of an address management table in respect of cache data according to the first embodiment of the present invention;

FIG. 5A is a flow chart of processing in the event of a write access request according to the first embodiment of the present invention;

FIG. 5B is a flow chart of processing in the event of a read access request according to the first embodiment of the present invention;

DESCRIPTION OF THE PREFERRED EMBODIMENTS

Embodiments of the present invention are described with reference to the drawings. It should be noted that the embodiments described below are not limitative of the scope of the invention and defined in the claims, and it is not necessarily the case that a combination of all of the features described in these embodiments is necessary as means of solution according to the present invention.

First Embodiment

Figure 1:
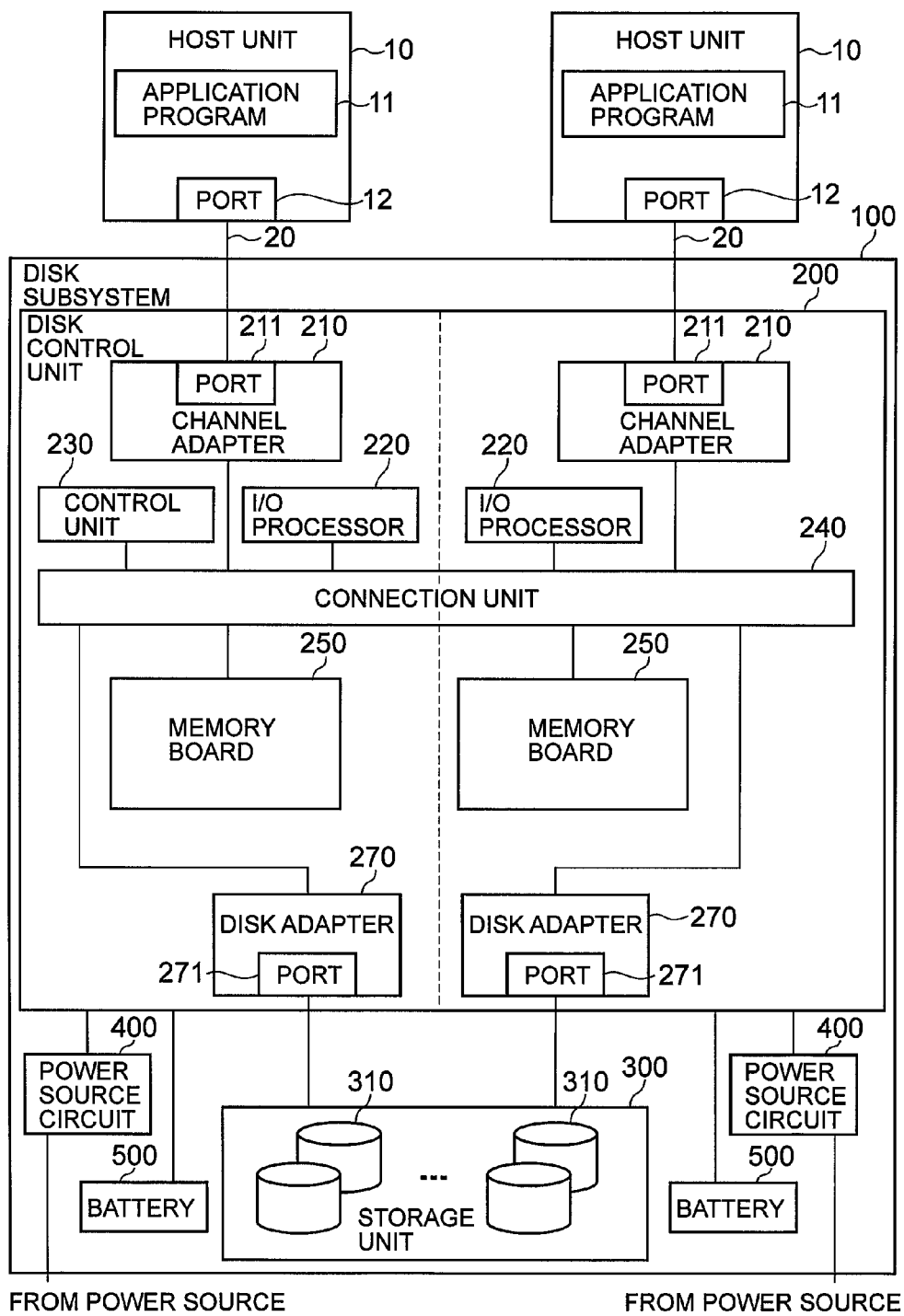
FIG. 1 is a structure diagram of a computer system according to a first embodiment of the present invention.

FIG. 1 is a structure diagram of a computer system according to a first embodiment of the present invention.

A computer system comprises one or more host units 10 and one or more disk subsystems 100. The host unit 10 and the disk subsystems 100 are connected through a network 20. The network 20 may be any of for example a SAN (storage area network), LAN (local area network), the Internet, a private line (least line) or public line, so long as it is capable of performing data communication. Also, as the protocol in the network 20, any protocol may be employed that is capable of exchange of data between the host unit 10 and the disk subsystems 100, such as for example fiber channel protocol or TCP/IP protocol. It should further be noted that, instead of the network 20, a direct connection by means of a cable of the host unit 10 and disk subsystems 100 could be employed.

The host unit 10 comprises for example a CPU (central processing unit), not shown, memory, not shown, an input device such as a keyboard, and a display. The host unit 10 may be constituted by for example an ordinary computer (personal computer). An application program 11 is provided on the host unit 10. Also, the host unit 10 comprises a port (PORT) 12 that is capable of connection with the network 20.

Write access to the data or read access to the data can be achieved in respect of the disk subsystems 100 by execution of an application program 11 by the CPU of the host unit 10.

The disk subsystems 100 comprise a disk control device 200 as an example of a storage control unit, a storage unit 300, a plurality of power source circuits 400 and a plurality of batteries 500.

A storage unit 300 includes a plurality of storage devices 310. The storage devices 310 may be for example hard disk drives (HDDs). In the disk subsystem 100, one or more logical volumes may be provided, based on the storage space of the plurality of storage disks 310. Also, in the disk subsystem 100, a RAID (redundant array of independent disks) group may be constituted by means of two or more storage devices 310 in the plurality of storage disks 310 and the storage space of the RAID group may be provided as one or more logical volumes.

The power source circuits 400 supply the power that is supplied from for example an external commercial power source to the various units of the disk control unit 200. In this embodiment, the power source circuit 400 on the right-hand side of the Figure supplies power to the various units on the right-hand side of the disk control unit 200, indicated by the broken line, and the power source circuit 400 on the left-hand side of the Figure supplies power to the various units on the left-hand side of the disk control unit 200, indicated by the broken line.

The batteries 500 accumulate power and are arranged to supply this at prescribed locations of the disk control unit 200. In this embodiment, the battery 500 on the right-hand side in the Figure is arranged to supply power to the various units on the memory boards 250 on the right-hand side of the Figure and the battery 500 on the left-hand side of the Figure is arranged to supply power to the various units on the memory boards 250 on the left-hand side of the Figure.

The disk control unit 200 comprises: a plurality of channel adapters 210, a plurality of I/O processors 220, a control unit 230, a connection unit 240, a plurality of memory boards 250 and a plurality of disk adapters 270. The channel adapters 210, I/O processors 220, control unit 230, memory boards 250 and disk adapters 270 are respectively connected through the connection unit 240.

The connection unit 240 makes possible mutual communication between the channel adapters 210, I/O processors 220, control unit 230, memory boards 250 and disk adapters 270. The connection unit 240 may be for example a crossbar switch through which data transmission is performed in accordance with the switch operation.

The channel adapter 210 comprises a port 211 for connection with the network 20. The channel adapter 210 executes communication with the host unit 10 that is connected through the port 211. In this embodiment, exchange of various types of information referring to data reading and data writing with the host unit 10 is executed.

Through the connection unit 240, the control unit 230 is capable of accessing the channel adapters 210, I/O processors 220, memory boards 250 and disk adapters 270: the administrator employs these units for maintenance and management purposes. The control unit 230 may comprise for example input devices such as a keyboard and/or a mouse whereby the administrator can perform input, a CPU, ROM, RAM, a hard disk drive, and a display for display and output of information. In this embodiment, the control unit 230 acquires the unique identifiers of the memory boards 250 that are mounted in the memory board slots of the disk control unit 200 from the memory boards 250 and also acquires the identification numbers (slot number) of the slots in which these are mounted, and stores these in association with each other.

The disk adapter 270 comprises a port 271 for connection with the various storage devices 310 of the storage unit 300. The disk adapter 270 exchanges data with the storage devices 310.

The I/O processor 220 executes various types of control processing by executing a program that is read into shared memory 254 (see FIG. 2) on the memory boards 250. The I/O processor 220 controls transfer of data between the channel adapters 210, the memory boards 250 and the disk adapters 270. For example, it performs control whereby the data received by the channel adapter 210 is stored in the cache memory 253 (see FIG. 2) on the memory boards 250. Also, the I/O processor 220 performs control of transfer of the data stored in the cache memory 253 to the disk adapter 270, or transfer thereof to the channel adapter 210. Also, the I/O processor 220 performs control to store in the cache memory 253 data acquired by the disk adapter 270 from the storage device 310. Also, the I/O processor 220 performs control to restore to the cache memory 253 data that has been saved and stored in the non-volatile memory 255.

The memory boards 250 are demountable with respect to the memory board slot of the disk control unit 200.

FIG. 2 is a structure diagram of a memory board according to a first embodiment of the present invention. The memory boards 250 comprise a memory controller 251, a processor 252, cache memory 253, shared memory 254, non-volatile memory 255, non-volatile memory 256 and voltage monitoring control unit 257.

The memory controller 251 is connected with the connection unit 240 and is also connected with the processor 252, the cache memory 253, the shared memory 254, non-volatile memory 255 and non-volatile memory 256.

The memory controller 251, under the control of the I/O processor 220, control unit 230 or processor 252, executes processing for storage of the data transmitted from the connection unit 240 in memory (cache memory 253, shared memory 254, non-volatile memory 205 or non-volatile memory 256) in the memory boards 250, or processing for transmission of data stored in memory in the memory boards 250 to the connection unit 240, or processing for transfer of data between memories in the memory boards 250. Also, the memory controller 251 performs processing for encryption of data saved and stored in the non-volatile memory 255. In this embodiment, the memory controller 251 performs encryption using for example a Caesar cipher, whereby the amount of data is unchanged.

The voltage monitoring control unit 257 monitors the voltage of the power that is supplied to the memory boards 250 from the power source circuit 400 to ascertain whether the voltage is abnormal, such as for example being below a prescribed voltage: if abnormality is detected, it sends a message to that effect to the processor 252 and exercises control such that power from the battery 500 is supplied to prescribed locations of the memory boards 250 (such as for example the processor 252, memory controller 251, cache memory 253, shared memory 254 and non-volatile memories 255, 256). Also, the voltage monitoring control unit 257 exercises control such as to cut off supply of power from the battery 500 during data saving processing, to be described.

The cache memory 253 is volatile memory such as for example DRAM (Dynamic Random Access Memory). The cache memory 253 temporarily stores data received by the channel adapter 210 and data acquired from the storage devices 310 by the disk adapter 270. The cache memory 253 is constituted by for example a plurality of cache memory devices capable of individual input/output operation.

The processor 252 executes various types of control processing by executing a program that is read into the shared memory 254. For example, the processor 252 executes processing for saving and storing cache data stored in the cache memory 253 to the non-volatile memory 255.

The shared memory 254 is volatile memory that stores various types of information. The information that is thus stored may include for example configuration information 261 (such as for example information indicating where data is stored in the storage device 310) and control information 260 (such as for example information indicating where data is stored in the cache memory 253) relating to the data that is exchanged with the host unit 10.

The non-volatile memories 255 and 256 are memories that are capable of storing data even when not supplied with power and may be for example flash memory, MRAM (Magnetoresistive Random Access Memory) or PRAM (Phase change RAM).

The non-volatile memory 255 is employed for example for saving and storing data stored in the shared memory 254 of the cache memory 253. In this embodiment, the non-volatile memory 255 is used to store dirty data, so it is necessary that this non-volatile memory 255 should have sufficient capacity to store the dirty data stored in the cache memory 253. This means that the amount of dirty data that can be stored in the cache memory 253 is determined by the capacity of the non-volatile memory 255 in order to ensure reliable saving of data. Also, in this embodiment, the data of the cache memory 253 can be saved and stored in the non-volatile memory 255 in these memory boards 250 for each memory board 250, so the data can be reliably saved and stored in each memory board 250. The non-volatile memory 256 stores an address management table 262 for restoring the data saved and stored in the non-volatile memory 255 to its original condition and a unique identifier 263 (for example the manufacturing number of the memory board 250) that uniquely identifies the memory board 250.

Next, an example of the configuration information and control information stored in the shared memory 254 will be described with reference to the drawings.

FIG. 3A is a diagram showing an example of control information according to the first embodiment of the present invention and FIG. 3B is a diagram showing an example of configuration information according to the first embodiment of the present invention.

As shown in FIG. 3A, the control information 260 includes a record associating a logical address 2601, a cache address 2602, a staging bit 2603 and a dirty bit 2604.

A logical address for identifying the data is stored in the logical address 2601. The logical address may be for example a combination of a LUN (Logical Unit Number) and LBA (Logical Block Address) in the access request that is transmitted from the host unit 10. In this embodiment, the logical address is managed as a unit, so the amount of data that is managed by each record is a prescribed amount of data corresponding to the logical address.

The address of the cache memory 253 where the corresponding data is stored is stored in the cache address 2602.

In the staging bit 2603, there is stored a bit indicating whether or not the corresponding data agrees with the data stored in the storage device 310. For example, if the corresponding data agrees with the data stored in the storage device 310, "1" is stored in the staging bit 2603; if the corresponding data does not agree with the data stored in the storage device 310, "0" is stored.

In the dirty bit 2604, there is stored a bit indicating that the corresponding data is reflected in the storage device 310 (i.e. the data is clean data), or that the corresponding data is not reflected (dirty data). For example, "0" is stored in the dirty bit 2604 if the corresponding data is clean data and "1" is stored if the corresponding data is dirty data. Data in respect of which "0" is stored in the dirty bit 2604 i.e. clean data is present on the storage device 310. This data can therefore be extracted from the storage device 310 even if the power supply to the cache memory 253 is stopped, causing the cache memory 253 to be erased. There is therefore no possibility of data being lost from the disk subsystem 100, even if the power supply is stopped. In contrast, data in respect of which "1" is stored in the dirty bit 2604 i.e. dirty data is present on the cache memory 253 but is not reflected to the storage device 310. Consequently, if the power supply to the cache memory 253 is stopped, this data will be lost, with the result that it will be completely lost from the disk subsystem 100. The disk control device 200 is therefore arranged to ensure that, if voltage abnormality is generated, dirty data is saved from the cache memory 253 to non-volatile memory 255. Since the dirty data is thus saved to the non-volatile memory 255, data can be prevented from being completely lost from the disk subsystem 100. In this embodiment, dirty data is saved and clean data is not saved, so the capacity of non-volatile memory that is required for saving data can be reduced and data saving processing can be performed rapidly.

As shown in FIG. 3B, the configuration information 261 includes a record associating the logical address 2611 and the physical address 2612.

The logical address 2611 stores the logical address for specifying the data. For example a combination of the LUN (Logical Unit Number) and LBA (Logical Block Address) in the access command transmitted from the host unit 10 may be employed as the logical address. In the physical address 2612, there is stored a physical address, indicating the storage device 310 and the storage region in this storage device 310 where the data of the corresponding logical address is stored.

Next, an example of an address management table stored in the non-volatile memory 256 will be described with reference to the drawings.

FIG. 4A shows an example of an address management table in respect of control information relating to the first embodiment of the present invention; FIG. 4B shows an example of the address management table in respect of configuration information relating to the first embodiment of the present invention; and FIG. 4C shows an example of an address management table in respect of cache data relating to the first embodiment of the present invention.

The address management table 262 includes: an address management table 262A of control information for managing the address of the control information stored in the non-volatile memory 255; an address management table 262B for managing the address of the configuration information stored in the non-volatile memory 255; and an address management table 262C for managing the address of the cache data stored in the non-volatile memory 255.

The address management table 262A of the control information includes a record that associates the non-volatile memory address 2621, the shared memory address 2622 and the data length 2623.

The non-volatile memory address 2621 stores an address on the non-volatile memory 255 (non-volatile memory address) that is capable of being allocated to storage of control information. The shared memory address 2622 stores the address (shared memory address) where the control information whereby a corresponding storage region was allocated from the non-volatile memory addresses is stored on the shared memory 254. The data length 2623 stores the data length on the non-volatile memory 255 in respect of the corresponding control information.

The address management table 262B of the configuration information includes a record that associates a non-volatile memory address 2624, a shared memory address 2625 and data length 2626.

The non-volatile memory address 2624 stores an address on the non-volatile memory 255 (non-volatile memory address) that is capable of being allocated to storage of configuration information. The shared memory address 2625 stores the address (shared memory address) where the configuration information whereby a corresponding storage region was allocated from the non-volatile memory addresses is stored on the shared memory 254. The data length 2626 stores the data length on the non-volatile memory 255 in respect of the corresponding configuration information.

The address management table 262C of the cache data includes a record that associates a non-volatile memory address 2627, a cache memory address 2628 and data length 2629.

The non-volatile memory address 2627 stores an address on the non-volatile memory 255 (non-volatile memory address) that is capable of being allocated to storage of cache data. The cache memory address 2628 stores the address (cache memory address) where the cache data whereby a corresponding storage region was allocated from the non-volatile memory addresses is stored on the cache memory 253. The data length 2629 stores the data length on the non-volatile memory 255 in respect of the corresponding cache data.

Next, the processing operation of a disk control device according to the first embodiment of the present invention will be described.

FIG. 5A is a flow chart of processing in event of a write access request according to the first embodiment of the present invention.

Execution of the processing on write access request is commenced when the channel adapter 210 of the disk subsystem 100 receives a write access request that has been transmitted from the host unit 10 through the port 211 and this write access request is acquired by the I/O processor 220.

First of all, when the I/O processor 220 receives a write access request from the channel adapter 210 (Step S11), the I/O processor 220 acquires from the channel adapter 210 the data (write data) that is the subject of the write access request, and writes this write data to the cache memory 253 (Step S12). Next, the I/O processor 220 updates the record corresponding to this write data of the configuration information 261 in the shared memory 254 (Step S13). Specifically, the I/O processor 220 stores the cache address of the cache memory 253 where the write data was stored in the cache address 2602 of the record corresponding to the write data in the configuration information 261, and stores "1", indicating that the data is dirty data, in the data bit 2604.

Next, the I/O processor 220 detects the amount of dirty data stored in the cache memory 253 and determines whether or not this exceeds a pre-set threshold value (write cache threshold value) (Step S14). The amount of dirty data stored in the cache memory 253 can be detected from the number of addresses in respect of which "1" is stored in the dirty bit 2604 of the configuration information 261, by referring to the configuration information 261 of the shared memory 254. Also, the write cache threshold value is a threshold value that indicates that the dirty data can be reliably saved and stored in the non-volatile memory 255, if the amount of this dirty data in the cache memory 253 is no more than this threshold value. This write cache threshold value can for example be set by the control unit 230 in accordance with instructions input by the administrator, or can be set by the control unit 230 to a certain threshold value based on the data capacity of the non-volatile memory 255, or a dynamic threshold value can be set by the control unit 230, based on the operating condition of the storage subsystem 100 and the amount of data in the non-volatile memory 255. The write cache threshold value may be set to any capacity in for example a range of 50 to 80% of the capacity of the non-volatile memory 255.

If, as a result of the determination in Step S14, it is found that the amount of dirty data exceeds the write cache threshold value (Step S14: Yes), the I/O processor 220 causes at least some of the dirty data to be destaged (Step S15). Specifically, the I/O processor 220 stores at least some of the dirty data of the cache memory 253 in the storage device 310. In respect of this data, the content of the cache memory 253 is thereby reflected to the storage device 310. It should be noted that the data that is destaged may for example be dirty data with a low frequency of access or dirty data in respect of which the longest time has elapsed since previous access thereof.

Next, the I/O processor 220 updates the record corresponding to the data of the configuration information 261 of the shared memory 254 that was destaged (Step S16). Specifically, the I/O processor 220 stores "0", indicating that the data is clean data, in the dirty bit 2604 of the record corresponding to the data that was destaged in the configuration information 261, and terminates the processing performed on write access request. In this way, in the data saving processing, to be described, the dirty data in the cache memory 253 can be reliably saved and stored in the non-volatile memory 255.

However, if, as a result of the determination made in Step S14, it is found that the amount of dirty data does not exceed the write cache threshold value (Step S14: No), this indicates that the dirty data in the cache memory 253 can be reliably saved and stored in the non-volatile memory 255, so the I/O processor 220 terminates the processing performed on write access request. It should be noted that destaging processing (processing identical with that of Step S15 and Step S16), in which the dirty data of the cache memory 253 is stored in the storage device 310 may suitably be executed by the I/O processor 220 not merely in the case of processing on write access request but also for example if the processing load of the I/O processor 220 is light.

FIG. 5B is a flow chart of processing on read access request according to the first embodiment of the present invention.

The processing on read access request is executed if the channel adapter 210 of the disk subsystem 100 receives through the port 211 a read access request transmitted from the host unit 10, this read access request being acquired by the I/O processor 220.

First of all, when the I/O processor 220 acquires this read access request from the channel adapter 210 (Step S21), the I/O processor 220 determines whether or not the data (read data) that is the subject of the read access request is stored in the cache memory 253 (Step S22). Whether or not the data is stored in the cache memory 253 can be determined by for example confirming whether or not a record corresponding to the logical address included in the read access request is stored in the control information 260 in the shared memory 254.

If, as a result of the determination made in Step S22, it is found that the data is in fact stored in the cache memory 253 (Step S22: Yes), the I/O processor 220 reads the corresponding cache data from the cache memory 253, transmits the data that has thus been read to the host unit 10 that is the source of the request by using the channel adapter 210 (Step S23), and terminates the processing on read access request.

On the other hand, if, as a result of the determination in the Step S22, it is found that the data is not in fact stored in the cache memory 253 (Step S22: No), the I/O processor 220 stages the corresponding data (Step S24). Specifically, the I/O processor 220 reads this data from the storage device 310 in which the corresponding data is stored, and stores this data in the cache memory 253. Next, the I/O processor 220 updates the record corresponding to the data that was read in the configuration information 261 of the shared memory 254 (Step S25). Specifically, the I/O processor 220 adds a record corresponding to the data that has thus been read to the configuration information 260 of the shared memory 254 and stores the cache address of the cache memory 253 in which the data that has thus been read was stored, in the cache address 2602 of the record in question, and, in addition, stores "0", indicating that the data is clean data, in the dirty bit 2604. The I/O processor 220 then terminates the processing on read access request by sending the data that was read out to this cache memory 253 to the host unit 10 that issued the request by using the channel adapter 210.

Figure 6:
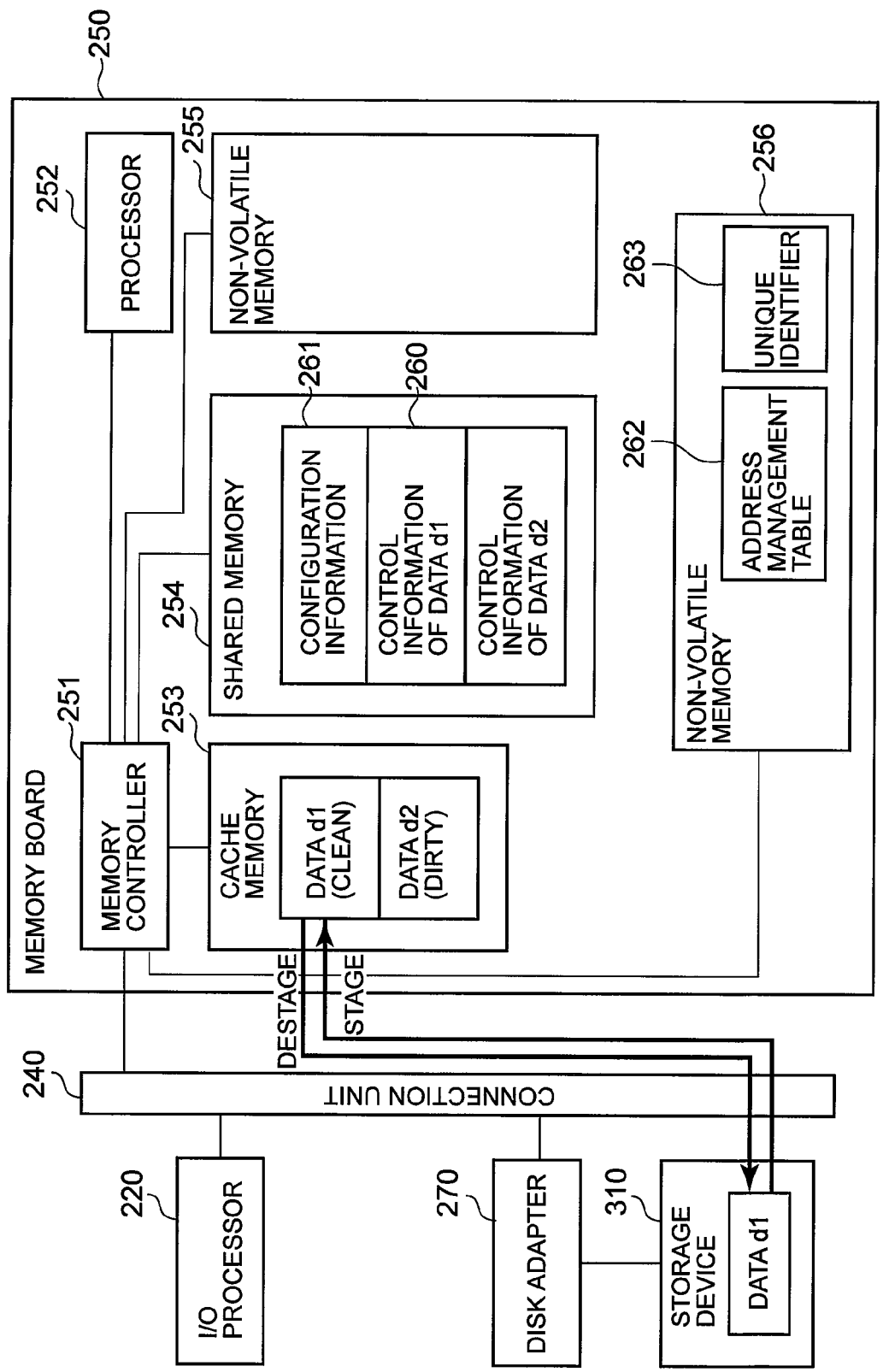
FIG. 6 is a diagram given in explanation of staging and destaging in a disk subsystem according to the first embodiment of the present invention.

FIG. 6 is a diagram given in explanation of staging and destaging in the disk subsystem according to the first embodiment of the present invention.

As shown in FIG. 6, staging means that the data stored in the storage device 310 is stored in the cache memory 253 and, as shown in FIG. 6, destaging means that the cache data stored in the cache memory 253 is reflected to the storage device 310.

Next, data saving processing in the storage subsystem 100 according to the first embodiment of the present invention will be described.

Figure 7:
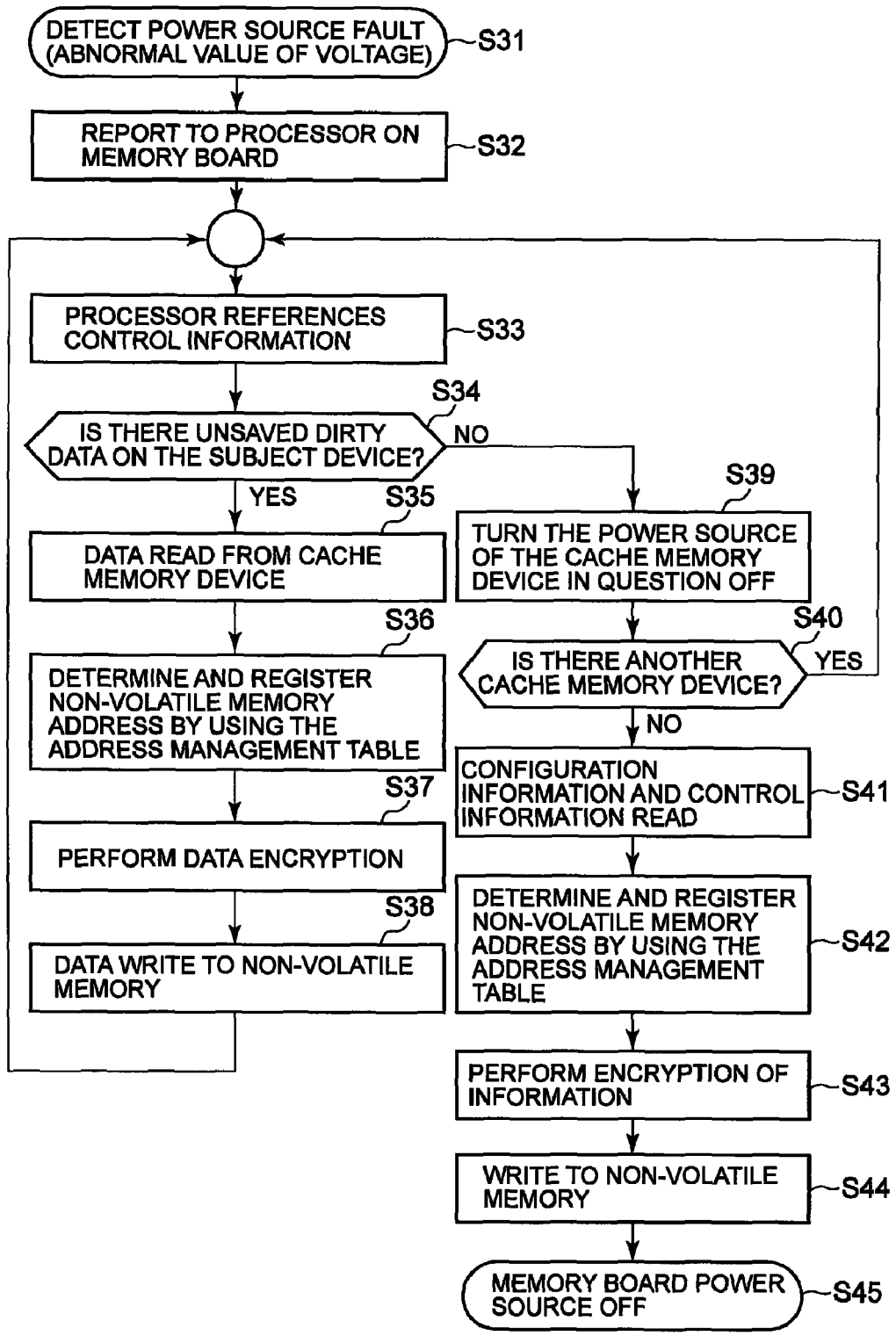
FIG. 7 is a flow chart of data save processing according to the first embodiment of the present invention.

FIG. 7 is a flow chart of data saving processing according to the first embodiment of present invention.

Data saving processing is commenced by detection of a power source fault, such as for example that the voltage that is supplied from the power source circuit 400 shows an abnormal value, by the voltage monitoring control unit 257 (Step S31). The voltage monitoring control unit 257 reports to the processor 252 of the memory board 250 that voltage abnormality has been generated and changes over the power that is supplied to the various units of the memory boards 250 from power supplied from the power source circuit 400 to power supplied from the battery 500 (Step S32). In this way, the various units of the memory boards 250 can continue operation by using the power supplied from the battery 500. Data storage in the cache memory 253 and shared memory 254 can thereby be maintained. It should be noted that, in the subsequent processing, the power of the battery 500 may be merely supplied to the memory boards 250. The amount of power that needs to be stored in the battery 500 can thereby be reduced.

The processor 252 determines whether one cache memory device of the cache memories 253 has unsaved dirty data that should be processed, by referencing (Step S33) the control information 260 of the shared memory 254 (Step S34).

If, as a result of the determination of Step S34, it is determined that unsaved dirty data is present in the cache memory device (Step S34: Yes), the processor 252 reads this dirty data from the cache memory device in question (Step S35), and determines the address (non-volatile memory address) of the non-volatile memory 255 in which this dirty data is to be stored, by using the address management table 262 of the non-volatile memory 256, and stores the address of the cache memory 253 where this dirty data is to be stored in the cache memory address 2628 of the record corresponding to the non-volatile memory address in question, and also stores the data length of this dirty data in the data length 2629 (Step S36).

Next, the processor 252 transfers the dirty data and the non-volatile memory address where this dirty data is stored to the memory controller 251. The memory controller 251 encrypts the dirty data that is transferred thereto from the processor 252 (Step S37) and stores this in the designated non-volatile memory address of the non-volatile memory 255 (Step S38). In this way, the dirty data is encrypted and stored in the non-volatile memory 255, so, even if this data is read from the non-volatile memory 255, it is not easily possible to ascertain the original data from this data that has thus been stored, so leakage of information can be suitably prevented.

Next, the processor 252 repeats the processing from the above Step S33 in respect of the same cache memory device. By such repetition of the processing, all the dirty data stored on the same cache memory device can be saved to the non-volatile memory 255.

On the other hand, if, as a result of the determination of Step S34, it is found that there is no unsaved dirty data in the cache memory device (Step S34: No), this indicates that no dirty data is present in the subject cache memory device, or that all the dirty data of this cache memory device has been saved, so the processor 252, by using the voltage monitoring control unit 257, cut off the power supply to the cache memory device in question (Step S39) and determines whether there is any other cache memory device in respect of which processing for saving of dirty data should be performed (Step S40).

If, as a result of Step S40, it is found, that there is another cache memory device that should be the subject of processing for saving of dirty data (Step S40: Yes), processing from Step S33 in the same way as described above is executed in respect of this other cache memory device.

On the other hand, if, as a result of Step S40, it is found that there is no other cache memory device that should be the subject of processing for saving of dirty data (Step S40: No), this means that saving of all of the dirty data of the cache memory 253 has been completed, so the processor 252 reads configuration information 261 from the shared memory 254 and control information relating to the dirty data, of the control information 260 (Step S41), and determines the address of the non-volatile memory 255 where the configuration information and control information are stored, in accordance with the address management table 262A of the control information and the address management table 262B of the configuration information of the non-volatile memory 256 (i.e. the non-volatile memory addresses), and stores the addresses of the shared memory 254 where this configuration information and control information was stored in the shared memory addresses 2622, 2625 of the record corresponding to the non-volatile memory in question, and stores the data length of the configuration information or control information in question in data length 2623 and data length 2626 (Step S42).

Next, the processor 252 transfers the configuration information and control information, together with the non-volatile memory address where this configuration information and control information is stored, to the memory controller 251. The memory controller 251 encrypts the configuration information and control information that is transferred thereto from the processor 252 (Step S43) and stores this in the designated non-volatile memory address of the non-volatile memory 255 (Step S44). Next, the processor 252 disconnects the supply of power to the memory board 250 in question, as specified by the voltage monitoring and control unit 257 (Step S45).

In this embodiment, the memory controller 251 cache memory 253, shared memory 254, non-volatile memories 255, 256 and processor 252 that are involved in the above data saving processing are provided on the same memory board 250, so data saving processing can be performed rapidly.

Figure 8:
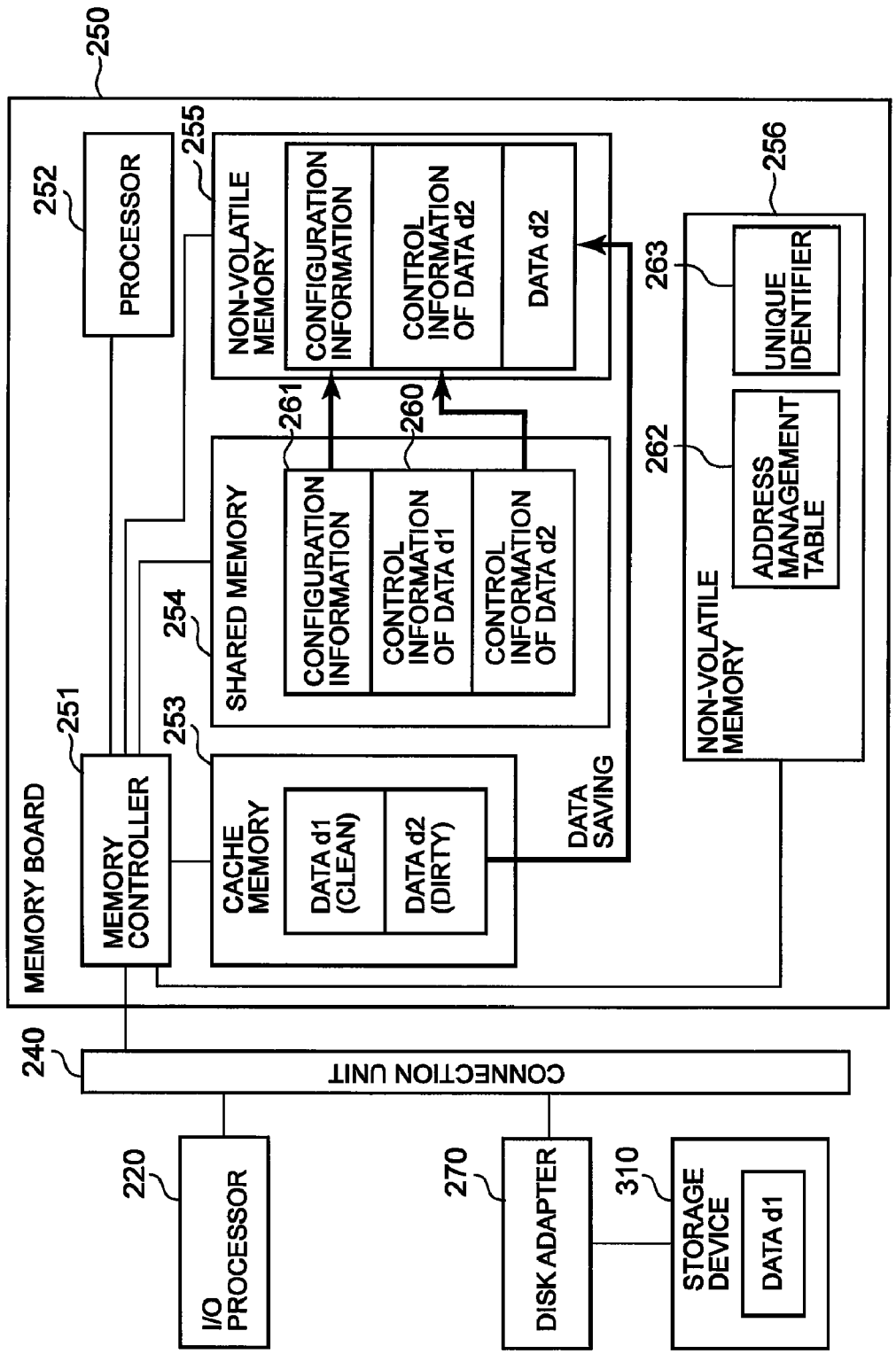
FIG. 8 is a diagram given in explanation of saving of data according to the first embodiment of the present invention.

FIG. 8 is a diagram given in explanation of saving of data according to the first embodiment of the present invention.

When data saving processing as shown in FIG. 7 described above is executed, data d2 constituting dirty data stored in the cache memory 253 is saved to the non-volatile memory 255. Also, configuration information 261 of the shared memory 254 is saved to the non-volatile memory 255. Also, control information of the data d2 in the control information 260 of the shared memory 254 is saved to the non-volatile memory 255. In this process, the address management table 262 that indicates the original storage destination of the data d2, configuration information and control information that was saved in the non-volatile memory 255 is stored in the non-volatile memory 256.

Figure 9:
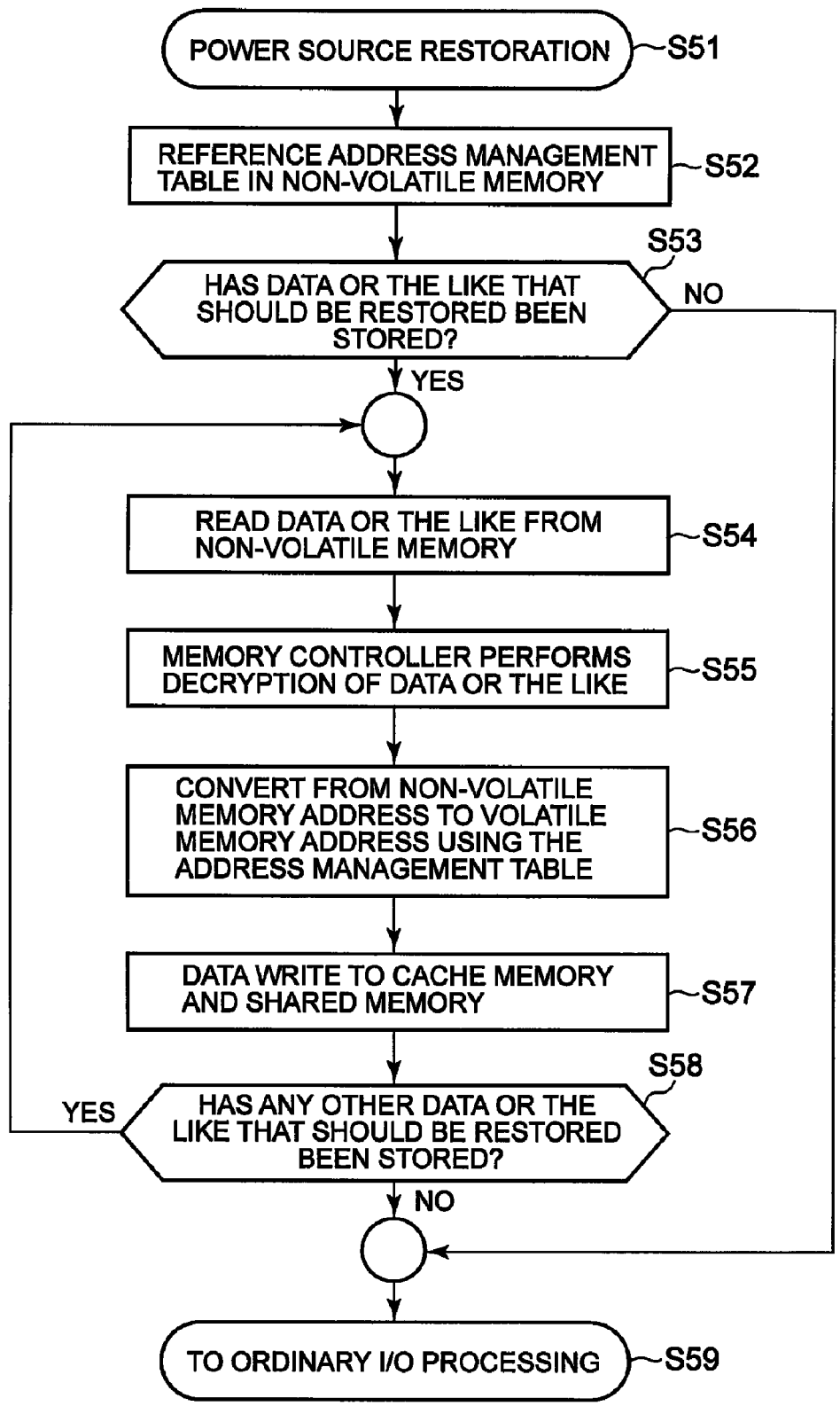
FIG. 9 is a flow chart of data restoration processing according to the first embodiment of the present invention.

FIG. 9 is a flow chart of data restoration processing according to the first embodiment of the present invention.

Data restoration processing is commenced when the power of the disk control device 200 is restored (Step S51): first of all, the I/O processor 220 determines whether or not the data or the like to be restored (cache data, configuration information and control information) has been stored, by referencing (Step S52) the address management table 262 in the non-volatile memory 256 (Step S53). It should be noted that whether the data or the like has been stored or not can be determined in accordance with whether or not an address has been stored in the shared memory addresses 2622, 2625 or the cache memory address 2628 of the address management table 262.

If, as a result of this determination, it is found that the data to be restored has been stored (Step S53: Yes), the I/O processor 220 reads the data or the like from the corresponding address of the non-volatile memory 255, in accordance with the address management table 262 in the memory controller 251 and, in addition, decrypts this data or the like that has thus been read and thereby converts the address of this data or the like to the address for the volatile memory (cache memory 253 or shared memory 254) (Step S56). Specifically, it acquires the shared memory address 2622, 2625 or cache memory address 2628 of the corresponding data or the like from the address management table 262.

Next, using the memory controller 251, the I/O processor 220 writes the data or like to the shared memory 254 or cache memory 253 in accordance with the converted address (Step S57), and determines whether or not there is any other data or the like to be restored (Step S58): if there is other data to be restored (Step S58: Yes), it restores the dirty data prior to saving and the configuration information and control information relating to the dirty data to their original condition by repeatedly executing the processing from Step S54 referred to above. In this way, the dirty data can be utilized in various types of processing in the same way as before data saving.

On the other hand, if the data or the like to be restored is not stored (Step S53: No), or if restoration of all of the data to be restored has been completed (Step S58: No), control shifts to ordinary I/O processing (Step S59).

The memory boards 250 of this embodiment are demountable with respect to the disk control unit 200, as described above, and the cache data is saved to a non-volatile memory 255 of the memory boards 250. There is therefore a risk of leakage of the content of the cache data if the memory board 250 onto which the cache data is saved is removed from the disk control unit 200 and mounted on another disk control unit 200. Accordingly, in this embodiment, arrangements are made to prevent leakage of data saved to the memory board 250 by executing the following data restoration determination processing.

Figure 10:
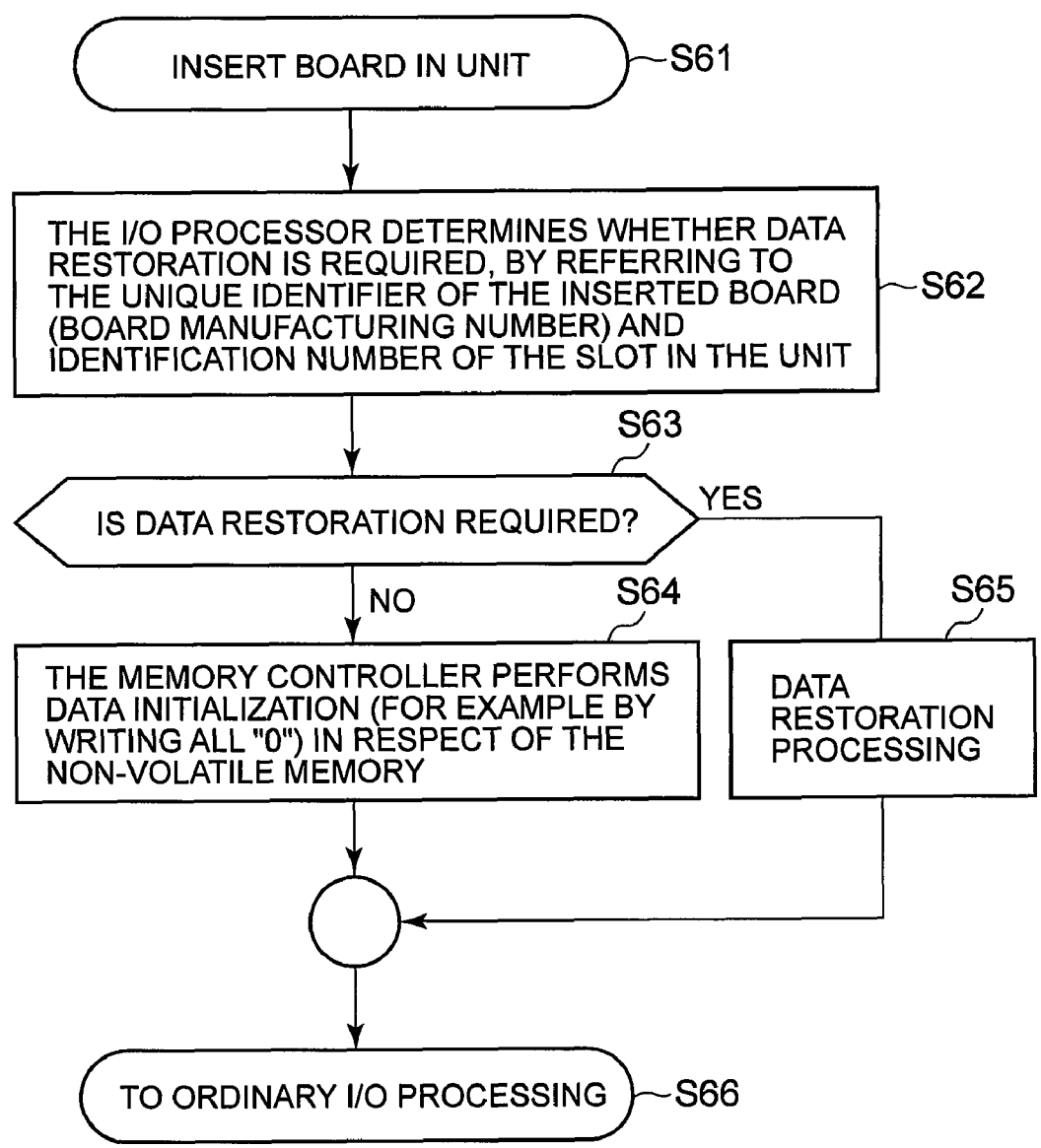
FIG. 10 is a flow chart of the processing of data restoration determination according to the first embodiment of the present invention.

FIG. 10 is a flow chart of data restoration determination processing according to the first embodiment of the present invention.

When insertion of a memory board 250 in a memory board slot of the disk control unit 200 is detected (Step S61), the I/O processor 220 acquires the unique identifier 263 of the memory board 250 from the non-volatile memory 256 of the memory board 250 which has thus been mounted, and determines whether or not data restoration is required, based on this unique identifier 263 and the slot number in which this memory board 250 is mounted (Step S62). In this embodiment, the I/O processor 220 acquires the unique identifier and slot number of the memory board 250 that was previously mounted from the control unit 230, and determines whether restoration is necessary or not depending on whether the unique identifier 263 of the newly mounted memory board 250 and the slot number agree. Specifically, if the unique identifier 263 and the slot number agree, this means that the memory board 250 was temporarily removed and the same memory board 250 reinserted in the same slot; consequently if, when attempting to perform data restoration, it is found that the unique identifier 263 differs, it may be concluded that the memory board is not the one that was previously mounted in the disk control unit 200 in question, so, in order to prevent leakage of the data of this memory board, data restoration is not performed; also, even if the unique identifier is the same but the slot number is different, this means that a different connection has been made from that when the data was saved, so it is arranged that data restoration shall not be performed.

If, as a result of the above determination, it is determined that data restoration is not needed (Step S63: No), in order to reliably prevent leakage of data, the I/O processor 220 initializes the data of the non-volatile memory 255 by for example writing "0" in all the storage regions by using the memory controller 251 (Step S64), and then shifts to ordinary I/O processing (Step S66).

On the other hand, if it is found that data restoration is necessary (Step S63: Yes), data restoration processing (Step S65: the same as the processing of Step S52 and subsequent steps in FIG. 9) is executed, and processing then shifts to ordinary I/O processing (Step S66).

Next, a modified example of the computer system according to the first embodiment described above will be described.

Figure 11:
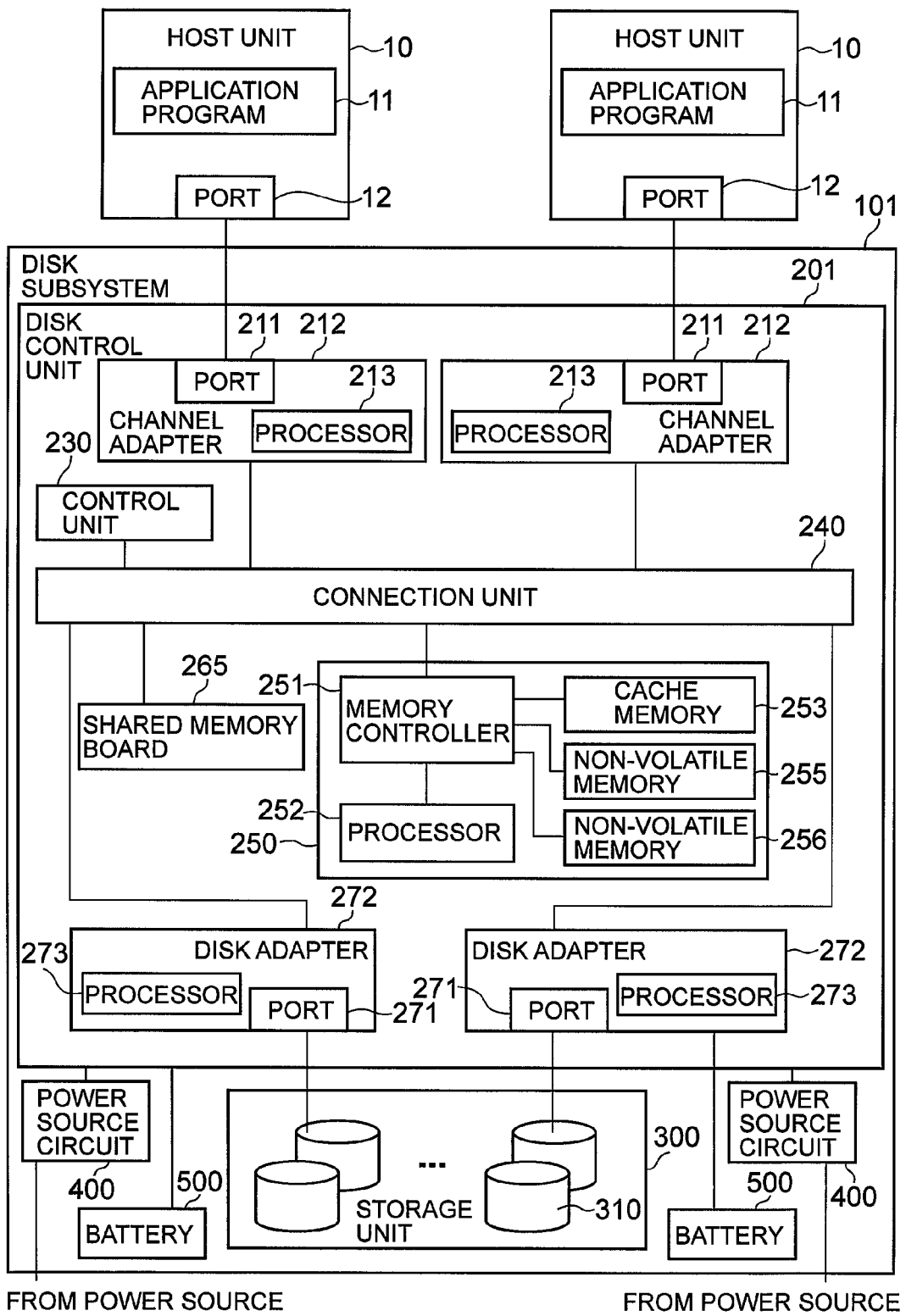
FIG. 11 is a structure diagram of a computer system according to a modified example of the present invention.

FIG. 11 is a structure diagram of a computer system according to a modified example of the present invention. Functional sections that are the same as in the case of the first embodiment are given the same reference symbols and further description is dispensed with.

The disk control unit 201 of a disk subsystem 101 according to the modified example comprises a channel adapter 212 instead of the channel adapter 210 in the disk control unit 200 according to the first embodiment, comprises a disk adapter 272 instead of the disk adapter 270; comprises a shared memory 254 of a memory board 250 in a shared memory board 265 different from the memory board 250, and the I/O processor 220 is removed.

The channel adapter 212 further comprises a processor 213 in respect of the channel adapter 210. The disk adapter 272 further comprises a processor 273 in the disk adapter 270. The processor 213 and the processor 273 execute in dispersed fashion the processing that was implemented by the I/O processor 220.

With this disk control unit 201, the same processing can be executed as in the case of FIG. 7, FIG. 9 and FIG. 10 described above, and the same benefits can be obtained. In this case, the processing that was executed by the processor 252 in FIG. 7 and FIG. 9 may be executed by for example either of the processors 213 and 273, and the processing of the I/O processor 220 in FIG. 10 may be executed by either of the processors 213, 273, for example.

Second Embodiment

Figure 12:
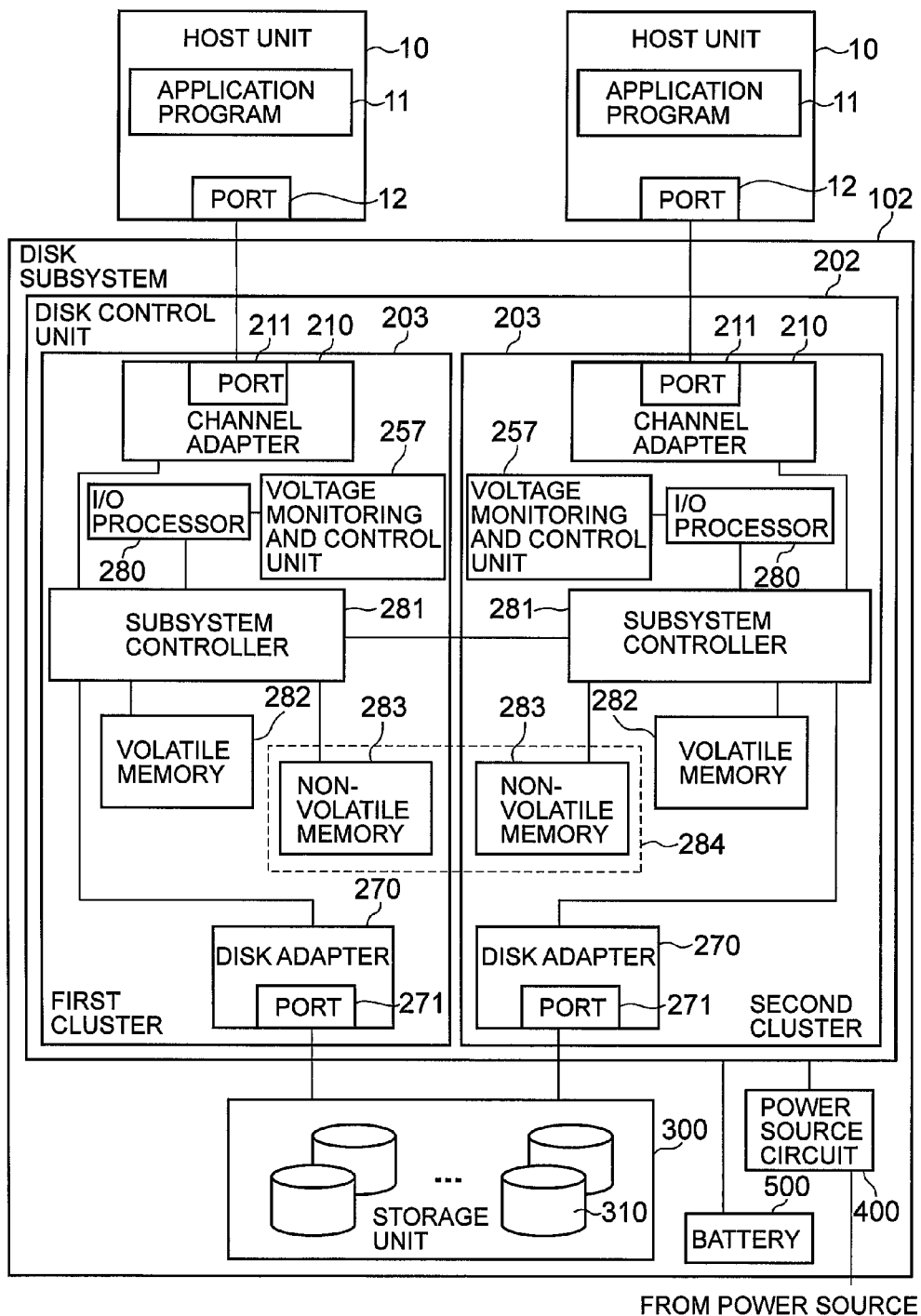
FIG. 12 is a structure diagram of a computer system according to a second embodiment of the present invention.

FIG. 12 is a structure diagram of a computer system according to a second embodiment of the present invention. Functional sections that are the same as in the case of the first embodiment are given the same reference symbols.

The disk control unit 202 comprises a plurality of clusters 203 having the same construction. Each cluster 203 is constituted by for example a single control board subsystem control board, and comprises: a channel adapter 210, an I/O processor 280, a subsystem controller 281, volatile memory 282, non-volatile memory 283, a disk adapter 270 and a voltage monitoring control unit 257.

A power source circuit 400 supplies power that is supplied from for example an external commercial power source to the various units of the disk control unit 202. In this embodiment, the power source circuit 400 is arranged to supply power to the various units of a plurality of clusters 203 without duplication. It should be noted however that, by providing more than one power source circuit 400, it could be arranged to supply power to the respective clusters 203 individually.

A battery 500 accumulates power and is arranged to supply a prescribed location of the disk control unit 202. In this embodiment, the battery 500 is not duplicated but is arranged to supply power to a prescribed location of a plurality of clusters 203. It should be noted that, by providing a plurality of batteries 500, it could be arranged to supply power to the prescribed locations of the respective clusters 203 individually.

An I/O processor 280 controls the entire operation of the clusters 203 by executing a program that is read to the volatile memory 282. The I/O processor 280 controls transfer of data between the channel adapter 210, volatile memory 282, non-volatile memory 283 and disk adapter 270 by a subsystem controller 281. For example, it performs control whereby data received by the channel adapter 210 is stored in a volatile memory 282. Also, the I/O processor 280 performs control such as transfer of data stored in the volatile memory 282 to the disk adapter 270 or transfer thereof to the channel adapter 210. Also, the I/O processor 280 performs control for storage in the volatile memory 282 of data extracted from a storage device 310 by the disk adapter 270. Also, the I/O processor 280 performs processing for restoring data that has been saved and stored in the non-volatile memory 283 to the volatile memory 282.

The subsystem controller 281 is connected with the channel adapter 210, the disk adapter 270, volatile memory 282, non-volatile memory 283, processor 280, and subsystem controller 281 of another cluster 203, and performs relaying of data that is exchanged with the various units. By means of this construction, the subsystem controller 281, under the control of the I/O processor 280, stores write data received from a host unit 10 through the channel adapter 210 in volatile memory 282 and transmits write data to the subsystem controller 281 of another cluster 203 and is thereby able to store write data in the volatile memory 282 of the other cluster 203. Also, in this embodiment, the subsystem controller 281, under the control of the I/O processor 280, transmits data to the subsystem controller 281 of another cluster 203, and can thereby store this data in non-volatile memory 283 of the other cluster 203, or read data from the non-volatile memory 283 of the other cluster 203.

Also, the subsystem controller 281 executes processing for storage of data in a RAID group constituted by a plurality of non-volatile memory devices 2831 (see FIG. 13) of the non-volatile memory 283. For example, when effecting storage in the RAID group, the subsystem controller 281 divides the data that is the subject of storage into prescribed data units, and, for each of a plurality of data units (for example three data units) generates the parity of each of these units by means of a parity generating circuit 2811, and stores this plurality of data units and the parity that has thus been generated in different non-volatile memory devices 2831 in the RAID group. In this embodiment, the subsystem controller 281 encrypts the data units and the parity and stores these in the non-volatile memory device 2831.

Next, the volatile memory 282 and non-volatile memory 283 will be described in detail.

Figure 13:
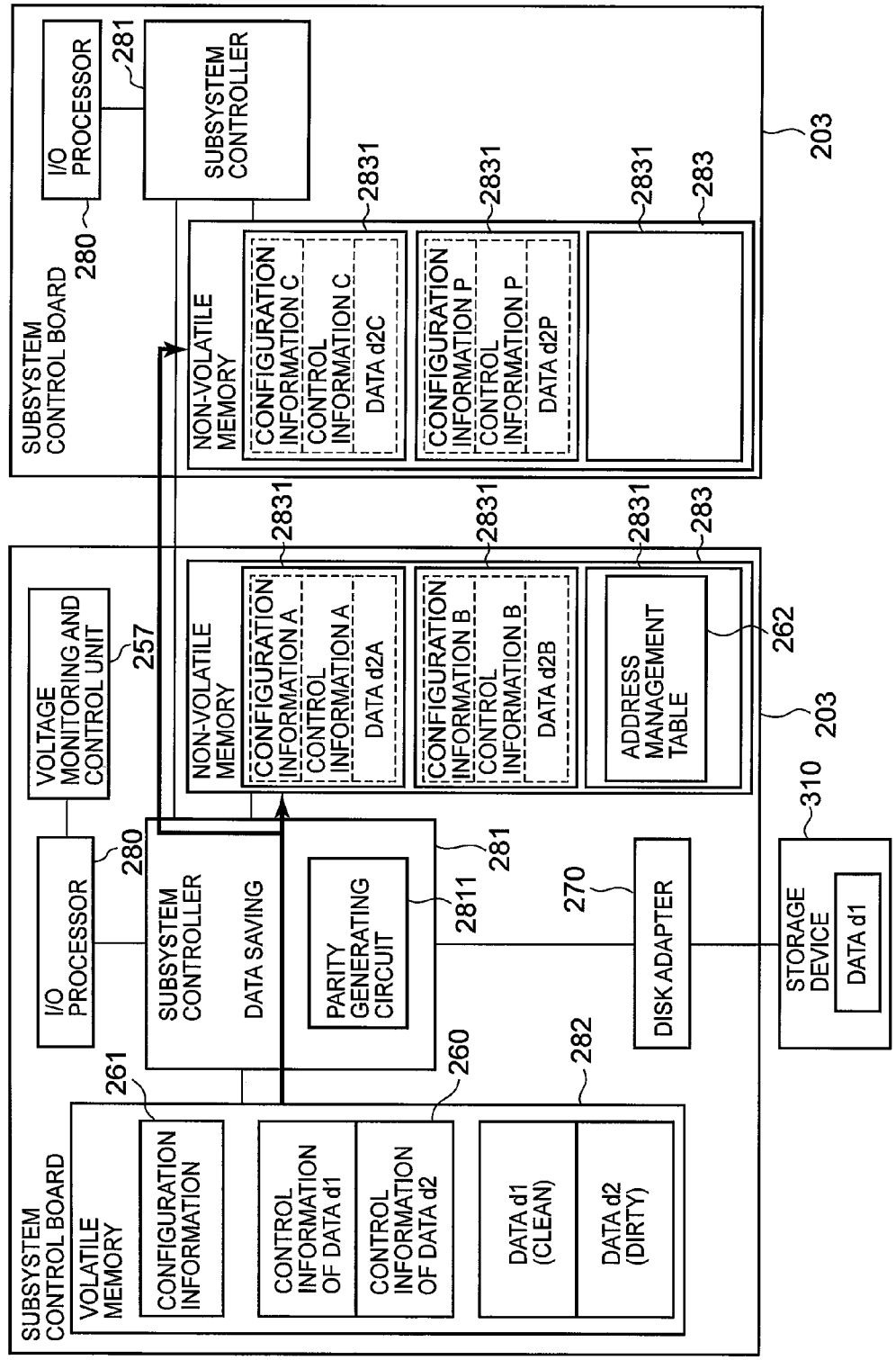
FIG. 13 is a diagram describing in detail part of a storage control unit according to the second embodiment of the present invention.

FIG. 13 is a diagram describing in detail the storage control unit according to the second embodiment of the present invention.

The volatile memory 282 stores information of various types, like the shared memory 254 and cache memory 253 of the first embodiment. The information that is stored may comprise for example configuration information 261 relating to the data that is exchanged with the host unit 10 (for example information indicating the location of storage of the data in question in the storage device 310) and control information 260 (for example information indicating the location of storage in the volatile memory 282). Also, the volatile memory 282 temporarily stores the data that is received by the channel adapter 210 or the data that is acquired from the storage device 310 by the disk adapter 270. The volatile memory 282 comprises for example a plurality of volatile memory devices in respect of which input/output operation can be individually performed.

The non-volatile memory 283 is memory capable of storing data even without a supply of power, such as for example flash memory, MRAM (Magnetoresistive Random Access Memory) or PRAM (Phase change RAM). The non-volatile memory 283 comprises for example a plurality of non-volatile memory devices 2831. The non-volatile memory 283 is employed for example for saving and storage of data (cache data, configuration information or control information) that is stored in the volatile memory 282. In this embodiment, the cache data, configuration information and control information are stored on a RAID group comprising a plurality of non-volatile memory devices 2831 of the non-volatile memory 283 of a plurality of clusters of 203. For example any of RAID levels 2 to 5 may be employed when effecting storage in the RAID group. By employing these RAID levels, data reliability can be improved while keeping down the capacity required for the non-volatile memory 283. Also, the non-volatile memory 283 stores an address management table 262 for restoring the data that was saved and stored in the non-volatile memory 283 to its original state. It should be noted that, in this second embodiment, the non-volatile memory addresses 2621, 2624 and 2627 in the address management table 262 are not physical addresses of the non-volatile memory 283, but are addresses (logical addresses) in a logical storage region of the RAID group. The subsystem controller 281 is arranged to be capable of specifying a physical address (i.e. which address on which non-volatile memory device 2831 (also including non-volatile memory devices 2831 of other clusters 203)) from this logical address. Also, the address on the volatile memory 282 is stored in the shared memory address 2622, shared memory address 2625 and cache memory address 2628 of the address management table 262.

Figure 14:
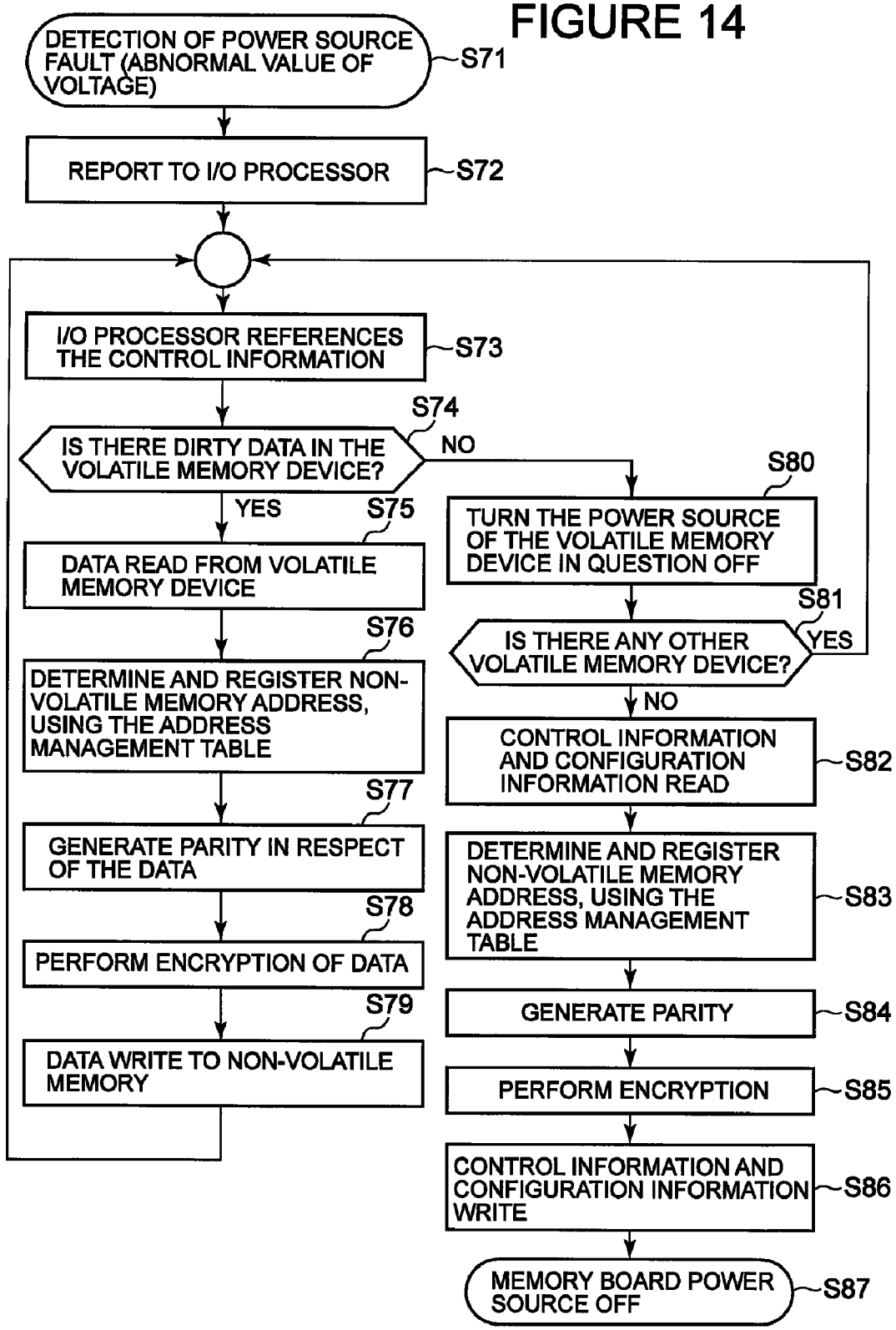
FIG. 14 is a flow chart of data save processing according to the second embodiment of the present invention.

FIG. 14 is a flow chart of data saving processing according to the second embodiment of the present invention.

Data saving processing is commenced by detection of a power source fault, such as for example that the voltage that is supplied from the power source circuit 400 shows an abnormal value, by the voltage monitoring control unit 257 (Step S71). The voltage monitoring control unit 257 reports to the I/O processor 280 that voltage abnormality has occurred and changes over the power that is supplied to the various units of the cluster 203 (subsystem control board) from the power that is supplied from the power source circuit 400 to the power that is supplied from the battery 500 (Step S72). In this way, operation of the various units of the subsystem control board can be continued by means of the power that is supplied from the battery 500. Consequently, the volatile memory 282 can continue to store data.

By referencing the control information 260 of the volatile memory 282 (Step S73), the I/O processor 280 determines whether or not there is any data that has not yet been saved, by inspecting, as processing target, a single memory device in the volatile memory 282 (Step S74).

If, as a result of the determination of Step S74, it is found that dirty data that has not yet been saved is present in the volatile memory device (Step S74: Yes), the I/O processor 280 reads the dirty data from the volatile memory device in question (Step S75), determines the logical address of the non-volatile memory 283 where this dirty data is to be stored in accordance with the address management table 262 of the non-volatile memory 283, stores the address of the volatile memory 282 that previously stored this dirty data in the cache memory address 2628 of the record corresponding to the logical address of this non-volatile memory 283, and stores the data length of this dirty data in the data length 2629 (Step S76).

Next, the I/O processor 280 transfers the dirty data, together with the logical address of the non-volatile memory 283 where the dirty data in question is stored, to the subsystem controller 281. The subsystem controller 281 divides the dirty data that is transferred from the I/O processor 280 into data units of prescribed size (amount of data), and, for each of a plurality of data units generates the parity corresponding to these data units (Step S77) and encrypts the plurality of data units and the parity that has thus been generated (Step S78). Next, the subsystem controller 281 specifies a physical address for respective storage of the data units and parity, based on the logical address of the non-volatile memory 283 that has been designated, and stores the data units and parity in the non-volatile memory device 2831 indicated by the corresponding physical address (Step S79). In this embodiment, it also affects storage in the non-volatile memory device 2813 of another cluster 203. In this way, the data and parity corresponding to these data are stored in dispersed fashion over a plurality of non-volatile memory devices 2831. The original data can therefore be restored even if some fault occurs in one or other of the non-volatile memory devices 2831. Also, since the dirty data is stored in the non-volatile memory 283 in encrypted form, even if this data is read from the non-volatile memory 283, it is not easily possible to ascertain the original data from this data that has thus been stored, so leakage of information can be suitably prevented.

Next, the I/O processor 280 repeats the processing from the Step S73 referred to above, in respect of the same volatile memory device. By thus repeating the processing, all of the dirty data stored on the same volatile memory device can be saved on the non-volatile memory 283.

On the other hand, if, as a result of the determination of Step S74, it is found that no unsaved dirty data is present on the volatile memory device (Step S74: No), since this indicates that no dirty data is present in the volatile memory in question, or that all of the dirty data in the volatile memory in question has been saved, under the control of the voltage monitoring and control unit 257, the I/O processor 280 disconnects the power supply to the volatile memory device in question (Step S80) and determines whether or not there is another volatile memory device that is subject of processing for saving dirty data (Step S81).

If, as a result of the determination of Step S81, it is found that there is another volatile memory device that is the subject of processing for saving of dirty data (Step S81: Yes), the same processing from Step S73 as described above is executed in respect of this other volatile memory device.

On the other hand, if, as a result of Step S81, it is found that there is no other volatile memory device that is the subject of saving of dirty data (Step S81: No), this means that saving of all of the dirty data of the volatile memory 282 has been completed, so the I/O processor 280 reads the configuration information 261 from the volatile memory 282 and the control information relating to the dirty data, of the control information 260 (Step S81), and determines the logical address of the non-volatile memory 283 where this configuration information 261 and control information 260 are to be saved, in accordance with the address management table 262 of the non-volatile memory 283, and stores the address of the volatile memory 282 where this configuration information 261 or control information 260 is saved in the shared memory address 2622 or 2625 of the record corresponding to the logical address of this non-volatile memory, and stores the data length of this configuration information 261 or control information 260 in the data lengths 2623, 2626 (Step S83).

Next, the I/O processor 280 transfers to the subsystem controller 281 the configuration information 261 and control information 260, together with the logical address of the non-volatile memory 283 where these are stored. The subsystem controller 281 divides the configuration information 261 and control information 260 that are transferred from the I/O subsystem 280 into data units of prescribed size (amount of data), and, for each prescribed number of data units, generates parity corresponding to these data units (Step S84), and encrypts the plurality of data units and the parity that has thus been generated (Step S85). Next, the subsystem controller 281 specifies a physical address where the data units and parity are to be respectively stored, on the basis of the logical address of the designated non-volatile memory 283, and stores the data units and parity in the corresponding non-volatile memory device 2831 indicated by the physical address (Step S86). In this way, the data and parity corresponding to this data are stored in dispersed fashion over a plurality of non-volatile memory devices 2831. Consequently, the original data can be restored even if a fault occurs in any one of the non-volatile memory devices 2831.

Next, the I/O processor 280 cuts off power supply to all of the units of the cluster 203, under the control of the voltage monitoring and control unit 257 (Step S87).

Figure 15:
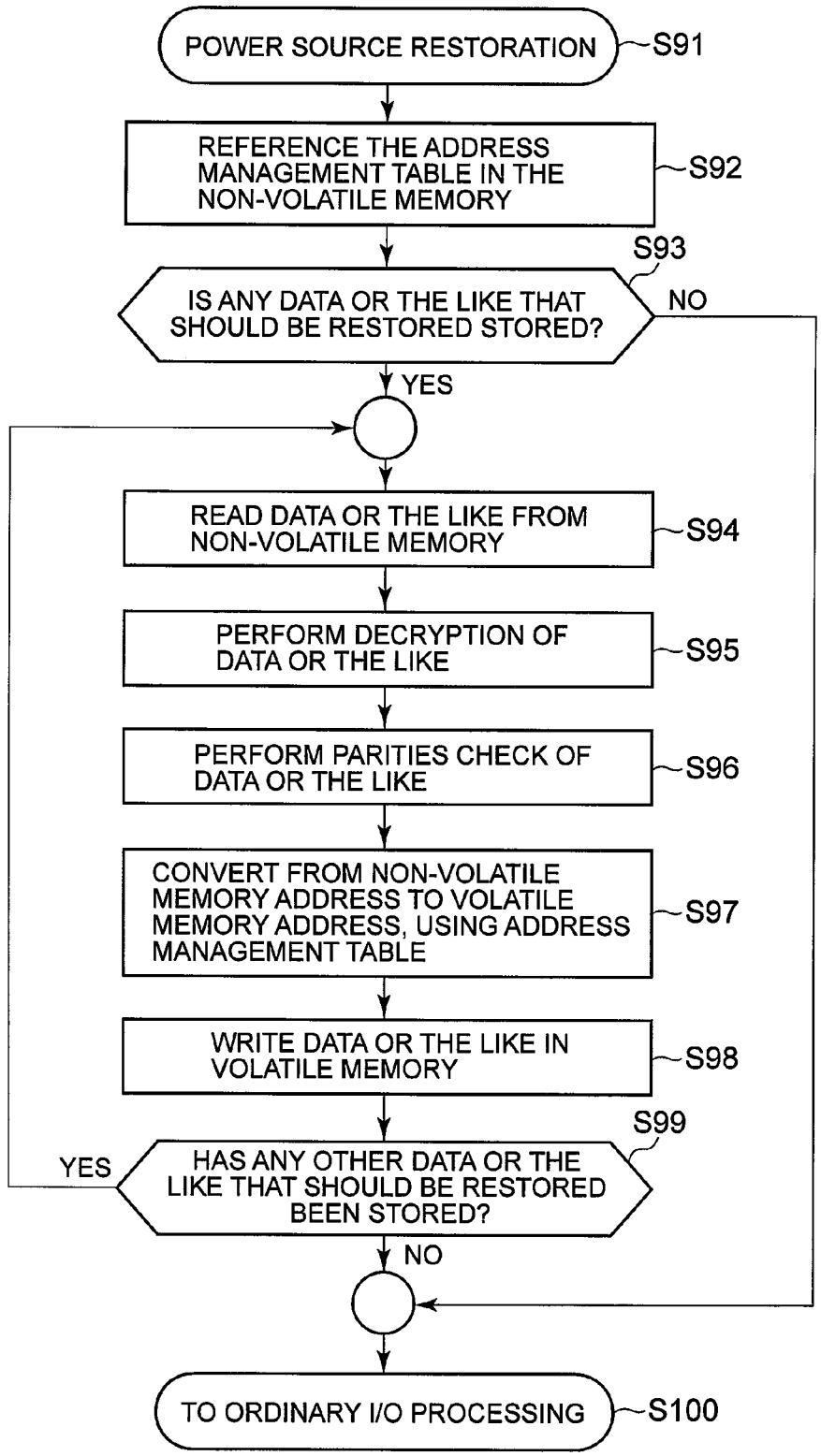
FIG. 15 is a flow chart of data restoration processing according to the second embodiment of the present invention.

FIG. 15 is a flow chart of data restoration processing according to the second embodiment of the present invention.

Data restoration processing is commenced when the power of the disk control unit 202 is restored (Step S91): first of all, the I/O processor 280 determines whether or not the data or the like to be restored (cache data, configuration information and control information) are stored, by referring (Step S92) to the address management table 262 in the non-volatile memory 283 (Step S93). Whether or not the data or the like have been stored can be determined by finding whether or not an address has been stored in the shared memory addresses 2622, 2625 or cache memory address 2628 of the address management table 262.

If, as a result of this determination, it is found that the data or the like to be restored has been stored (Step S93: Yes), the I/O processor 280 transfers the logical address of the non-volatile memory 283 that was acquired from the address management table 262 to the subsystem controller 281. The subsystem controller 281 specifies the physical address corresponding to this logical address, and reads the data or the like from the non-volatile memory 283 indicated by this physical address, and, furthermore, decrypts this data or the like that has thus been read (Step S95), and performs a parity check on each item of data or the like (Step S96). In this way, if there is a prescribed relationship between the prescribed number of data units and the parity corresponding to these, this means that the data is correct, so subsequent processing is performed without further ado, but, if the prescribed relationship is not present, the data is regenerated before performing subsequent processing.

Next, the subsystem controller 281 reconstitutes the original data by rearranging a plurality of data units in their original order, and transfers the reconstituted data to the I/O processor 280. The I/O processor 280 then acquires the address of the volatile memory 282 where the data was stored during saving from the shared memory address 2622 (Step S97), the shared memory address 2625 or the cache memory address 2628 of the address management table 262. Next, the I/O processor 280, using the subsystem controller 281, stores the data acquired from the non-volatile memory 283 in the acquired address of the volatile memory 282 (Step S98). It should be noted that, in this embodiment, data is stored in the volatile memory 282 of the other cluster 203 in the same way, using the subsystem controller 281 of the other cluster also. In this way, the conditions of the non-volatile memories 282 of a plurality of clusters can be put in the same condition.

Next, the I/O processor 280 determines whether or not there is other data or the like to be restored (Step S99) and, if there is other data or the like to be restored (Step S99: Yes), by repeatedly executing the processing from Step S94 above, the dirty data prior to data saving and the configuration information and control information relating to this dirty data are restored to their original condition. In this way, the dirty data can be employed for various types of processing in the same way as prior to data saving.

On the other hand, if there are no data or the like to be restored (Step S93: No), or if restoration of all of the data to be restored has already been completed (Step S99: No), processing shifts to ordinary I/O processing (Step S100).

While embodiments of the present invention have been described above, the present invention is not restricted to the embodiments described above and can be applied in various other modes.

For example, while, in the above embodiments, examples were given in which hard disk drives (HDD) were employed for the storage devices 310, the present invention is not restricted this and at least some or all of the hard disk drives could be substituted by other storage devices capable of storage of data such as for example DVD drives, magnetic tape drives, or flash memory devices.

Also, while, in the first embodiment described above, the shared memory 254 was described as being volatile memory, the present invention is not restricted to this and for example non-volatile memory could be employed. If non-volatile memory is employed for the shared memory 254, saving processing of the control information 260 and configuration information 261 on data saving need not be performed.

Also, although, in the above first embodiment, a construction was adopted in which the cache memory 253 and the shared memory 254 were physically separated, there is no restriction to this, and the cache memory 253 and the shared memory 254 could be constructed as a single unit.

Also, although, in the above first embodiment, a construction was adopted in which the non-volatile memory 255 and the non-volatile memory 256 were physically separated, 253 and the shared memory 254 were physically separated, there is no restriction to this, and the non-volatile memory could be constructed as a single unit.

Although, in the embodiments described above, encryption was employed in which the amount of data is unchanged, the present invention is not restricted to this and for example encryption could be performed in which the amount of data is changed. However, in this case, it is necessary to make the data length stored in the address management table 262 the data length after encryption.

Also, although, in the above embodiments, the dirty data of the cache memory 253 was directly stored in the non-volatile memory 255 with its data length unmodified, the present invention is not restricted to this, and it would also be possible to effect storage in the non-volatile memory 255 for example after compression of the dirty data of the cache memory 253. If this is done, the storage efficiency in the non-volatile memory 255 can be increased and the time required for writing processing to effect writing to the non-volatile memory 255 can be shortened.

Also, while, in the second embodiment, it was arranged to provide non-volatile memory 283 in the same way in each cluster 203 and to save the dirty data in a RAID group constituted by non-volatile memory 283 of a plurality of clusters 203, the present invention is not restricted to this and it would for example be possible to provide non-volatile memory 283 solely in one of the clusters 203 and to employ this for saving of the dirty data.

What is claimed is:

1. A storage control unit that, upon receipt of a write access request from an external unit, performs control of writing of data that is the subject of the write access request to a storage unit including a plurality of storage devices, the storage control unit comprising:
    a power supply unit that supplies power from a power source;
    a battery that stores power so that power can be supplied;
    a cache memory constituted by a volatile memory capable of storing data when supplied with power;
    a non-volatile memory capable of continuing to store data even without power supplied thereto, saving dirty data stored in said cache memory when failure of the power supply unit is detected;
    a request reception unit that receives the write access request when supplied with said power;
    a first data control unit that controls to store data that is the subject of said write access request in said cache memory as cache data;
    a determination unit that determines whether or not an amount of dirty data, of said cache data in said cache memory, that has not been reflected to said storage unit, exceeds a prescribed threshold value;
    a second data control unit that, if the determination is that said prescribed threshold value has been exceeded, controls to store at least a portion of said dirty data of said cache memory in said storage unit;
    a power source monitoring unit that detects a voltage abnormality of the power that is supplied from said power supply unit;
    a shared memory that stores configuration information and control information;
    a save storage unit that saves in said non-volatile memory the dirty data stored in said cache memory on receipt of supply of said power from said battery, if said voltage abnormality is detected by said power source monitoring unit,
    wherein when the save storage unit saves in said non-volatile memory the dirty data stored in said cache memory, the configuration information and the control information corresponding to the saved dirty data is also saved; and
    a power source supply control unit that maintains supply of power to said cache memory and said save storage unit using the power from said battery if said voltage abnormality is detected by said power source monitoring unit,
    wherein said save storage unit encrypts said dirty data before saving said dirty data in said non-volatile memory.

2. The storage control unit according to claim 1, further comprising:
    a threshold value determining unit that determines said prescribed threshold value in accordance with the capacity of said non-volatile memory.

3. The storage control unit according to claim 1, wherein said save storage unit executes encryption whereby the amount of data of said dirty data is unchanged.

4. The storage control unit according to claim 1, wherein said save storage unit compresses said dirty data before saving said dirty data in said non-volatile memory.

5. The storage control unit according to claim 1, further comprising:
    a storage destination information storage unit that saves in said non-volatile memory information regarding the storage destination of said dirty data in said cache memory.

6. The storage control unit according to claim 1, further comprising:
    a data restoration unit that restores dirty data that had been saved in said non-volatile memory to said cache memory.

7. The storage control unit according to claim 6,
    wherein a memory board that holds said non-volatile memory is demountable, and
    wherein the storage control unit further comprises:
    a mounting board information holding unit that holds first identification information of said memory board that has been mounted;
    a mounting detection unit that detects new mounting of a memory board that holds non-volatile memory;
    a board information acquisition unit that acquires second identification information of said memory board that has been newly mounted;
    a mounting determination unit that determines whether or not said second identification information that has been acquired agrees with said first identification information that is held by said mounting board information holding unit; and
    an initialization unit that, if non-agreement is determined, executes initialization of data of non-volatile memory of said newly mounted memory board without restoration of dirty data by said data restoration unit.

8. The storage control unit according to claim 7, further comprising:
a plurality of slots capable of mounting/demounting memory boards holding said non-volatile memory,
wherein said mounting board information holding unit stores in association said first identification information and first slot identification information of the slot where the memory board of said first identification information had been mounted,
wherein said board information acquisition unit acquires said second identification information and second slot identification information of the slot where the memory board of this second identification information had been mounted,
wherein said mounting determination unit determines whether or not said first identification information and said first slot identification information, and said second identification information and said second slot identification information agree, and
wherein said initialization unit executes initialization of the data of the non-volatile memory of said newly mounted memory board without restoration of dirty data by said data restoration unit, if said first identification information and said first slot identification information, and said second identification information and said second slot identification information do not agree.

9. The storage control unit according to claim 1,
wherein said non-volatile memory comprises a plurality of non-volatile memory devices, and
wherein said save storage unit stores said dirty data in a RAID group constituted by said plurality of non-volatile memory devices.

10. The storage control unit according to claim 9, wherein the said save storage unit divides said dirty data into a plurality of data units of prescribed size, and stores the data units in said plurality of non-volatile memory devices of said RAID group, and stores parity created from the data of a prescribed number of data units in said non-volatile memory devices of said RAID group.

11. The storage control unit according to claim 1, wherein said power supply control unit cuts off supply of power from said battery to said volatile memory after termination of saving of said dirty data to said non-volatile memory.

12. The storage control unit according to claim 1, wherein said cache memory comprises a plurality of volatile memory devices, and
wherein said power supply control unit successively cuts off the supply of power from said volatile memory devices after completion of saving of said dirty data by said save storage unit.

13. The storage control unit according to claim 1, wherein said power supply control unit supplies power to said cache memory and said save storage unit without supplying power to said request reception unit, if said voltage abnormality is detected by said power source monitoring unit.

14. The storage control unit according to claim 13, wherein said cache memory, said non-volatile memory, said save storage unit and said power supply control unit are provided on the same board, and
wherein said battery is capable of supplying power to said board.

15. The storage control unit according to claim 1, wherein said save control unit and said second data control unit are constituted by different devices, and
wherein said power supply control unit supplies power to said save storage unit without supplying power to said second data control unit, if said power monitoring unit detects said voltage abnormality.

16. The storage control unit according to claim 1, further comprising:
a plurality of sets of said cache memory and said non-volatile memory,
wherein said first data control unit controls to store the data that is the subject of said write access request on respective said cache memories of each of the sets, and
wherein said save storage unit, if said voltage abnormality is detected by said power monitoring unit, receives supply of said power from said battery, reads dirty data from one of the cache memories of said plurality of cache memories, and saves this dirty data in said plurality of non-volatile memories.

17. A method of data management using a storage control unit that, upon receiving a write access request from an external unit, performs control of writing data that is the subject of the write access request to a storage unit including a plurality of storage devices, wherein said storage control unit comprises:
a power supply unit that supplies power from a power source;
a battery that stores power so that power can be supplied;
a cache memory comprising volatile memory capable of storing data when supplied with power;
a non-volatile memory capable of continuing to store data even when not supplied with power and saving dirty data stored in said cache memory when failure of the power supply unit is detected;
a power source monitoring unit that detects voltage abnormality of the power supplied from said power supply unit;
a save store unit;
and a shared memory that stores configuration information and control information,
the method comprising:
storing the data that is the subject of said write access request in said cache memory as cache data, when the write access request is received;
determining whether or not an amount of dirty data, of said cache data of said cache memory, that has not been reflected to said recording unit exceeds a prescribed threshold value;
if the determination is that said prescribed threshold value is exceeded, storing at least a portion of said dirty data of said cache memory in said storage unit;
supplying power to said cache memory from said battery, if said voltage abnormality is detected by said power source monitoring unit; and
saving, by the save store unit, the dirty data stored in said cache memory to said non-volatile memory, by supply of said power from said battery, wherein when the dirty data stored in said cache memory is saved to said non non-volatile memory, the configuration information and the control information corresponding to the saved dirty data is also saved.

18. A storage control unit that, upon receiving a write access request from an external unit, performs control of writing data that is the subject of the write access request to a storage unit including a plurality of storage devices,
the storage control unit comprising:
a power supply circuit that supplies power from a power source;
a battery that stores power so that power can be supplied;
cache memory constituted by volatile memory capable of storing data when supplied with power; a non-volatile memory capable of continuing to store data even without power supplied thereto, saving dirty data stored in said cache memory when failure of the power supply unit is detected;

an interface that receives the write access request from said external unit;

a first processor connected with said interface and that is capable of input/output of data with said cache memory;

a second processor capable of input/output of data between said cache memory and said non-volatile memory;

a power source monitoring unit that detects voltage abnormality from said power source unit;

and a shared memory that stores configuration information and control information, wherein said first processor, upon receipt of a write access request received by said interface, stores the data that is the subject of said write access request in said cache memory as cache data, wherein said first processor determines whether or not an amount of dirty data, of said cache data of said cache memory, that has not been reflected to said storage device exceeds a prescribed threshold value, and if the determination is that said prescribed threshold value has been exceeded, said first processor stores at least a portion of said dirty data of said cache memory in said storage unit, wherein said second processor, if said power source monitoring and control unit detects said voltage abnormality, saves the dirty data stored in said cache memory in said non-volatile memory by receiving supply of said power from said battery, wherein when the second processor saves the dirty data stored in said cache memory in said non-volatile memory, the configuration information and the control information corresponding to the saved dirty data is also saved, and wherein said power source monitoring and control unit, if said voltage abnormality is detected, maintains supply of power to said cache memory and said second processor using the power from said battery, and wherein said second processor encrypts said dirty data before saving said dirty data in said non-volatile memory.

\* \* \* \* \*